(12) United States Patent
Takeda et al.

(10) Patent No.: US 10,749,356 B2
(45) Date of Patent: Aug. 18, 2020

(54) ELECTRIC WORK MACHINE

(71) Applicant: MAKITA CORPORATION, Anjo-shi (JP)

(72) Inventors: Kouichi Takeda, Anjo (JP); Takuya Kusakawa, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 0 days.

(21) Appl. No.: 16/161,357

(22) Filed: Oct. 16, 2018

(65) Prior Publication Data

US 2019/0115772 A1 Apr. 18, 2019

(30) Foreign Application Priority Data

Oct. 18, 2017 (JP) .................. 2017-202142

(51) Int. Cl.
| | |
|---|---|
| H02J 7/00 | (2006.01) |
| H02P 6/28 | (2016.01) |
| B27B 17/08 | (2006.01) |
| H02P 23/14 | (2006.01) |
| B25F 5/00 | (2006.01) |
| H02P 29/032 | (2016.01) |

(52) U.S. Cl.
CPC ............ *H02J 7/0029* (2013.01); *B25F 5/00* (2013.01); *B27B 17/08* (2013.01); *H02P 6/28* (2016.02); *H02P 23/14* (2013.01); *H02P 29/032* (2016.02); *H02J 7/00306* (2020.01)

(58) Field of Classification Search
CPC .................. H02J 7/0029; H02P 6/28
See application file for complete search history.

(56) References Cited

U.S. PATENT DOCUMENTS

| | | | | |
|---|---|---|---|---|
| 2004/0090195 | A1* | 5/2004 | Motsenbocker | ....... B63H 20/36 318/109 |
| 2012/0223663 | A1* | 9/2012 | Dietl | ..................... H02P 25/188 318/139 |
| 2015/0091480 | A1* | 4/2015 | Kischka | .................... H02P 3/18 318/374 |
| 2016/0185462 | A1* | 6/2016 | Edwards | ............. H02P 29/0243 701/34.4 |
| 2018/0205244 | A1 | 7/2018 | Ichikawa et al. | |

FOREIGN PATENT DOCUMENTS

JP 2017019065 A 1/2017

* cited by examiner

*Primary Examiner* — Cortez M Cook
(74) *Attorney, Agent, or Firm* — J-Tek Law PLLC; Jeffrey D. Tekanic; Scott T. Wakeman

(57) ABSTRACT

An electric work machine (2) includes a motor (M) and a control unit (36) that controls rotation of the motor. The control unit (36) is configured such that an operating mode is switchable between a normal mode, in which the motor is rotated within a prescribed output range, and a power mode, in which the motor is rotatable with energy greater than in the normal mode. Furthermore, the control unit (36) is configured to restrict use of the power mode.

17 Claims, 29 Drawing Sheets

ELECTRIC WORK MACHINE

CROSS-REFERENCE

This application claims priority to Japanese patent application serial number 2017-202142, filed on Oct. 18, 2017, the contents of which are incorporated herein by reference in their entirety.

TECHNICAL FIELD

The present disclosure relates, in general, to electric work machines (e.g., power tools, such as a chain saw) having an electric motor that is typically limited to being driven (e.g., rotated) within a preset output range, in order to protect the electric motor from permanent damage or premature deterioration.

BACKGROUND ART

Known electric work machines, such as the chain saw disclosed in Japanese Laid-open Patent Publication 2017-19065 and its counterpart US 2018/0205244, are configured to drive (energize) a motor (a motive-power source) in proportion to an amount of trigger manipulation (pressing, squeezing) by a user. In order to protect a battery that supplies electric power to the motor from over-discharging in this type of electric work machine, the electric current supplied during driving of the motor is restricted to being a prescribed upper-limit electric current or less.

SUMMARY OF THE INVENTION

However, if the electric current during motor drive is restricted as described above, when it is desired, for example, to perform special work in which the load is heavier than normal work, the output of the motor cannot be increased by supplying an electric current to the motor that exceeds the upper-limit electric current.

Consequently, if it is desired to temporarily perform special work in which the load is heavy, the user must prepare in advance (obtain) an electric work machine capable of performing the special work and then must pass the different electric work machines from one hand to the other when switching between normal work and special work, thereby reducing work efficiency.

On the other hand, if only the electric work machine for special work is used and it is desired to also perform normal work, then the user does not have to pass electric work machines from one hand to another; however, electric work machines designed for performing special work, in which the load is heavy, are typically larger and heavier than electric work machines for performing normal (i.e. lighter) work. Consequently, if only the larger, heavier electric work machine is used to perform both normal work and special work, work efficiency during normal work will be reduced, because the user is required to hold and maneuver a larger, heavier tool/machine.

Accordingly, one non-limiting object of the present disclosure is to disclose a technique such that a motor of an electric work machine can be temporarily driven at an output that is above its prescribed output range for normal operation so that special work, in which a load is larger than that of normal work, can be temporarily performed.

An electric work machine of one aspect of the present disclosure comprises a motor and a control unit that controls the rotation of the motor. Furthermore, the control unit is configured such that an (its) operating mode is switchable between a normal mode, in which the motor is rotated within a prescribed output range, and a power mode, in which the motor is rotatable with energy (is rotated by applying a current) greater than that in the normal mode.

Consequently, according to the electric work machine of this aspect of the present disclosure, by switching the operating mode of the control unit to the power mode, the motor is rotated with energy (is rotated by applying a current) greater than that in the normal mode, and therefore it becomes possible to perform special work, in which the load is large.

However, because the energy for driving the motor is increased during performance of special work in the power mode beyond that in the normal mode, an electric current larger than that in the normal mode flows to the motor. Thus, a burden is temporarily imposed on the motor, the motor drive system, the control unit, and the power-supply apparatus that supplies electric power to the electric work machine during use in the power mode.

That is, by increasing the electric current flowing to each of these parts in the power mode, each of these parts might generate excessive heat and deterioration or permanent damage might be caused. Accordingly, in the electric work machine of this aspect of the present disclosure, each of the above-mentioned parts is suitably protected by restricting the use of the power mode.

Therefore, according to the electric work machine of this aspect of the present disclosure, when a user wishes to temporarily perform special work, in which the load is larger than that of normal work, the special work can be performed by switching the operating mode of the control unit to the power mode, without imposing an undue or damaging burden on the electric work machine, the power-supply apparatus, or the like.

It is noted that, to drive or energize (e.g., rotate) the electric motor in the normal mode within the prescribed output range, the electric current supplied during the drive of the motor may be restricted to a prescribed upper-limit electric current or lower, the same as in previously existing apparatuses described above. Furthermore, in such an embodiment, to enable the motor to be energized (e.g., rotated) in the power mode with energy that is greater than in the normal mode, an upper-limit electric-current value, which is used to limit the electric current, may be set to a value that is greater than that in the normal mode. In the alternative, the current restriction may be entirely omitted (eliminated) in the power mode.

In addition, a stop current value, which stops the drive of the motor, may be set in the power mode to the upper-limit electric-current value of the normal mode or to a value that is larger than the stop current value.

In addition or in the alternative, to rotate the motor in the normal mode and the power mode within the prescribed output range, a counter may be incremented by a count value, which is set in proportion to the electric current flowing to the motor, and energization of the motor may be cut off when the value of that counter reaches a prescribed threshold value.

Furthermore, in this case, the threshold value of the counter in the power mode may be set to a value that is larger than that in the normal mode, or the count value set in proportion to the electric current may be set to a value that is smaller than that in the normal mode.

That is, in this way, the electric work machine is driven in the power mode with energy that is greater than in the normal mode, and therefore special work, in which the load is large, can be performed.

To make it possible to perform special work in the power mode without imposing an undue or damaging burden on the electric work machine, the power-supply apparatus, etc., the normal mode may be an operating mode in which continuous use is possible and the power mode may be an operating mode in which the motor is permitted to be rotated, e.g., only for a prescribed (predetermined) period of time.

If the electric work machine is configured to operate in this manner, for example, by receiving a supply of electric power (current) from a battery, then the control unit may be configured to restrict the use of the power mode based on a state (condition) of the battery or a usage state (e.g., usage amount) of the battery.

It is noted that, for example, the battery temperature, the battery voltage, and the like can be given as examples of the battery state (battery condition). Furthermore, for example, the battery's remaining charge, usage history, such as a charge/discharge count (deterioration state), and the like can be given as examples of the usage state of the battery. Additional examples of the battery state and battery usage state are provided hereinbelow.

In such an embodiment, when the battery's electric-power-supply performance decreases, performance (use) of the power mode is restricted in this manner, thereby curtailing or reducing the likelihood of deterioration or permanent damage of the battery caused by performance of the power mode.

In addition or in the alternative, if the electric work machine is configured to operate by receiving a supply of electric power from a battery, then the control unit may be configured to restrict use (performance) of the power mode based on a usage count of the power mode since the battery was mounted on the electric work machine.

In addition or in the alternative, the control unit may be configured to restrict use of the power mode based on a usage time of the power mode since the battery was mounted on the electric work machine.

Therefore, if use (performance) of the power mode is restricted based on the usage count and/or the usage time of the power mode in this manner, premature deterioration or permanent damage of the battery caused by performance of the power mode also can be curtailed.

In addition or in the alternative, the control unit may be configured to restrict use (performance) of the power mode based on a usage time of the electric work machine. That is, because the electric power consumption of the motor, the motor-drive system, the control unit, etc. increases as the usage time of the electric work machine lengthens, the temperature of these parts rises. Therefore, if the control unit is operated in the power mode in such a high-temperature state, then the electric power consumption of each of these parts will further increase, thereby possibly leading to deterioration or permanent damage.

Consequently, if the use (performance) of the power mode is restricted based on the usage time of the electric work machine, then deterioration or permanent damage of the electric work machine caused by performance of the power mode can be curtailed.

In addition or in the alternative, the control unit may be configured to restrict use of the power mode based on a state (condition) or a usage state of the electric work machine.

It is noted that, e.g., the motor temperature, the control unit temperature, the electric currents flowing to each of these parts, etc. can be given as examples of the state (condition) of the electric work machine. In addition, e.g., the usage history (such as the usage count and the usage time), the temperatures of the motor and the control unit estimated from the usage history (estimated values), etc. can be given as examples of the usage state.

Therefore, if use (performance) of the power mode is restricted in this manner based on the state (condition) and/or the usage state of the electric work machine, premature deterioration or permanent damage of the electric work machine caused by performance of the power mode also can be curtailed.

In addition or in the alternative, the control unit may be configured to transition to the normal mode or to the power mode, for example, by operation (manual manipulation) of a switch (e.g., an operating mode switch). On the other hand, if the electric work machine comprises a power supply switch that starts and stops the control unit, then the control unit may be configured to transition to the normal mode or to the power mode in accordance with an operation (manual manipulation) state of the power supply switch.

In this way, the control unit transitions to the normal mode or to the power mode in accordance with the operation state of the power supply switch during startup; thus, unintentional transitioning from the normal mode to the power mode after startup of the control unit (i.e. during operation in the normal mode) can be curtailed or prevented.

That is, because the motor is operated in the power mode at a load that is higher than in the normal mode, use of the power mode may be restricted as described above in order to protect the electric work machine and the power-supply apparatus, which supplies electric power thereto.

Therefore, if transition to the power mode is permitted (possible) only when the control unit is started by operation of the power supply switch as described above, then it is possible to reduce the likelihood of the operating mode of the control unit from mistakenly switching to the power mode during use (operation) of the electric work machine in the normal mode, such that use (performance) of the power mode can be suitably restricted or prevented when the power mode might present a safety concern.

It is noted that switching conditions of the operating mode based on the operation state of the power supply switch may be prescribed by, for example, the operation or manipulation time (e.g., long press and short press) of the power supply switch, the operation pattern/profile (e.g., operation count), or the like.

In addition or in the alternative, the control unit may be configured to transition to the normal mode or to a stopped state if, in the power mode, the amount of electric power that is consumed to drive the motor reaches a predetermined value. That is, because the amount of power consumed varies with the energization current supplied to the motor, the energization time, and the like, these parameters can be used to determine when the amount of consumed power has reached the predetermined value. Furthermore, when this determination is made, by transitioning from the power mode to the normal mode or to the stopped state, the performance time of the power mode can be restricted.

It is noted that, for example, if the energization current supplied to the motor is large in such a case, then the transition to the stopped state may be made in a short time; on the other hand, if the energization current is comparatively small, then the transition to the normal mode may be made when the energization time has reached a prescribed (predetermined) time.

DETAILED DESCRIPTION OF THE EMBODIMENTS

Embodiments of the present invention are explained below, with reference to the drawings.

Figure 1:
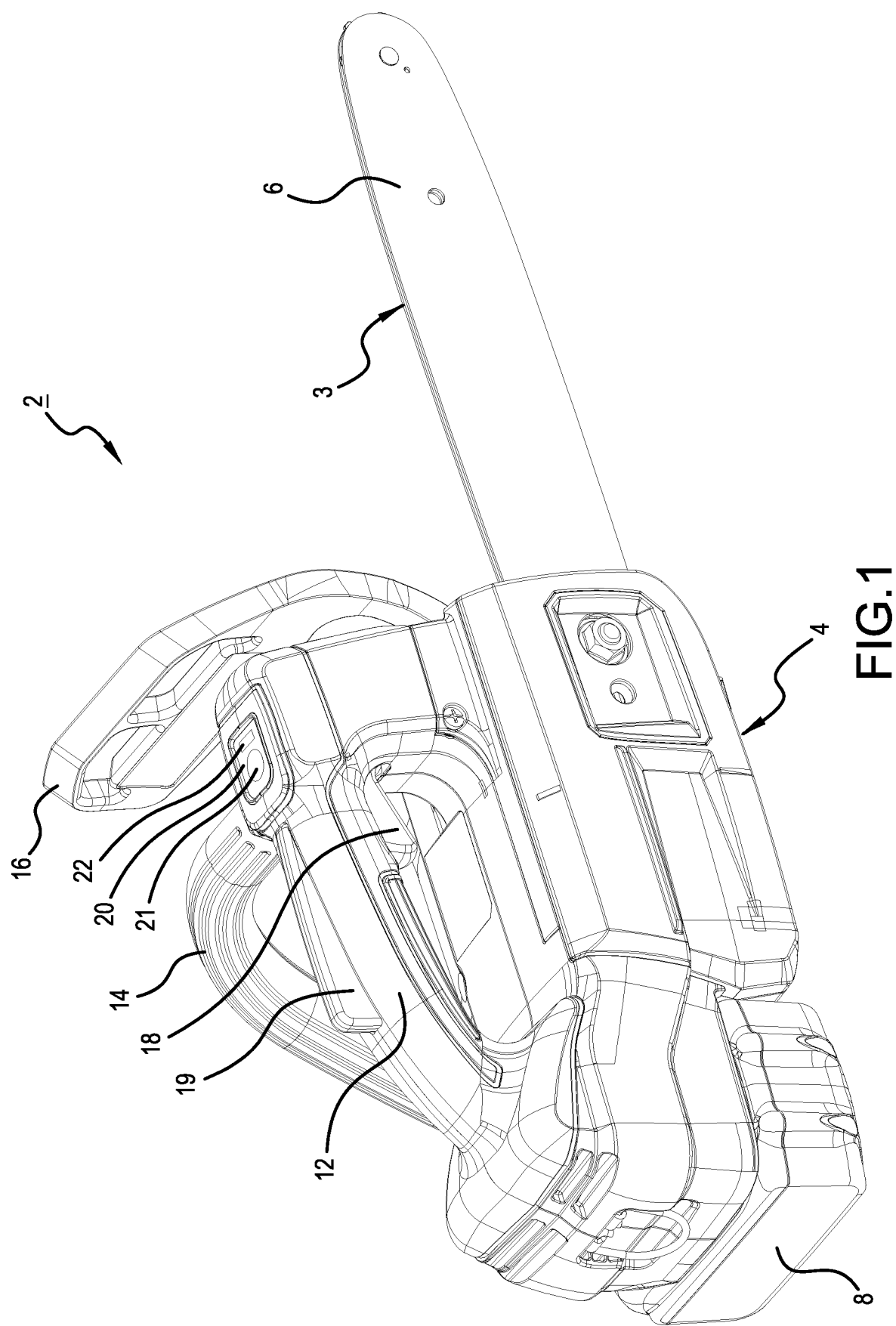
FIG. 1 is an oblique view that shows the overall configuration of a chain saw of one representative, non-limiting embodiment of the present disclosure.

As shown in FIG. 1, a chain saw 2 of the present embodiment is one type of a handheld power tool according to the present disclosure and comprises: a guide bar 6, around which a saw chain 3 is mounted; and a main body 4, on which the guide bar 6 is provided such that it extends therefrom.

The guide bar 6 supports both a sprocket (not shown), which is inside the main body 4, and the saw chain 3 such that it can circulate around the guide bar 6. Furthermore, a motor 10 (refer to FIG. 2), which circulates the saw chain 3 by rotating the sprocket, is housed inside the main body 4.

In addition, a first grip 12 and a second grip 14, which are designed for a user to grasp with his or her left and right hands, are provided on the main body 4. The first grip 12 forms a bridge over the main body 4 such that it extends, with the guide bar 6 oriented to forwardly project from the main body 4, from the front to the rear of the main body 4 and forms a grasp space between the main body 4 and the first grip 12.

In addition, a first end of the second grip 14 is coupled to a sidewall of a forward-upward portion of the first grip 12, and a second end is coupled to a sidewall of a rear-end portion of the main body 4. Consequently, the user can grasp the first grip 12 from above the main body 4 and also can laterally grasp the second grip 14 (in the drawing, on the left side) of the main body 4.

In addition, a hand guard 16, which is connected to an emergency-stop mechanism (not shown) of the motor 10, is provided farther forward of the first grip 12, and a battery pack 8 is detachably mounted onto a rearward-lower-end portion of the main body 4.

A drive switch 18 (hereinbelow, abbreviated as the "drive SW"), which can be operated by pulling with the hand with which the user is grasping the first grip 12, is provided on the first grip 12 forward and downward of a grasp part, which the user can grasp, and upward of the main body 4.

The drive SW 18 is a so-called trigger switch, which changes to an ON state upon being pulled by the user, and is connected to a control circuit 36 of a motor-drive unit 30 (refer to FIG. 2), which is housed together with the motor 10 inside the main body 4.

In addition, a lock-release lever 19 is provided on the first grip 12 in the upward direction on the side of the first grip 12 that is opposite the drive SW 18. The lock-release lever 19 engages with the drive SW 18 inside the first grip 12 and fixes (locks) the drive SW 18 at an inoperative position. Then, when the user depresses the lock-release lever 19 toward the first grip 12, it disengages from the drive SW 18, and thereby the drive SW 18 becomes operative.

Accordingly, in the chain saw 2 of the present embodiment, if the first grip 12 is grasped while the lock-release lever 19 is pressed from above, then the drive SW 18 can be operated by a fingertip; however, if the lock-release lever 19 is not pressed, the drive SW 18 cannot be operated (moved). It is noted that the lock-release lever 19 of this type is well known in the field of power tools, and therefore explanation of the detailed configuration thereof is omitted herein.

An operation panel 20 is provided on an upper surface of the forward-upward portion of the first grip 12. A main power-supply switch 21 (hereinbelow, abbreviated as the "main power-supply SW") and a state-indication part 22, which indicates operation states of the chain saw 2, are installed on the operation panel 20.

Figure 2:
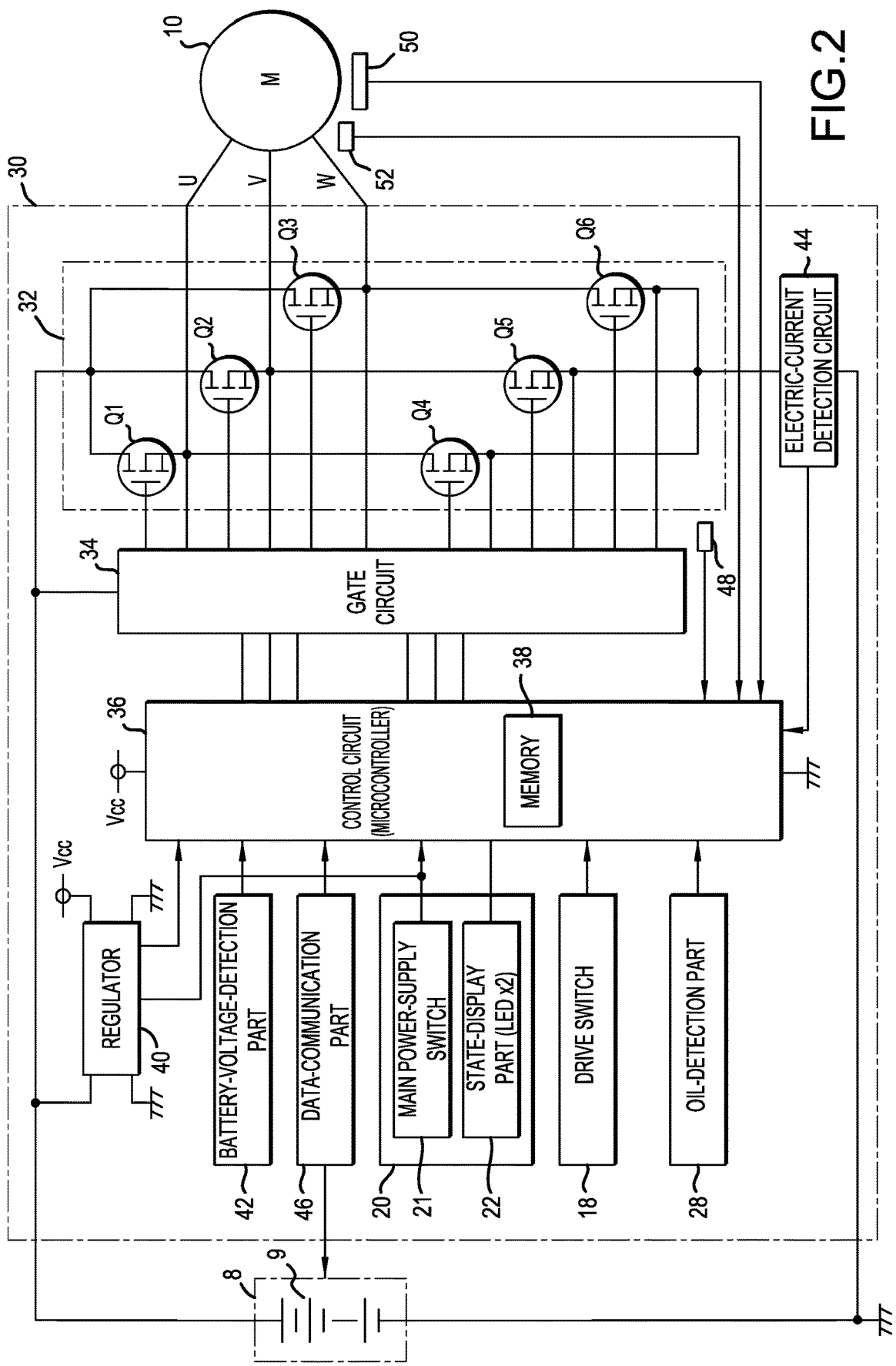
FIG. 2 is a block diagram that shows the electrical configuration of the chain saw of the embodiment of FIG. 1.

Both the main power-supply SW 21 and the state-indication part 22 are connected to the control circuit 36 of the motor-drive unit 30 (refer to FIG. 2). It is noted that, in the present embodiment, the main power-supply SW 21 is configured as a tactile switch that changes to the ON state only when it is operated (pressed) by the user. Consequently, every time the main power-supply SW 21 changes to the ON state, the control circuit 36 recognizes that the ON/OFF state of a main power supply has been switched.

The state-indication part 22 comprises two LEDs having differing lighting colors; by switching the lamp ON states of the two LEDs, the control circuit 36 distinguishably indicates the operating mode when the motor 10 is being controlled.

In addition, an oil-detection part 28, which detects the amount of oil inside an oil tank, is provided in the chain saw 2, and the oil-detection part 28 likewise is connected to the control circuit 36 of the motor-drive unit 30 (refer to FIG. 2). It is noted that the oil tank stores lubricating oil, which reduces wear, friction, and the like of the saw chain 3.

The motor-drive unit 30 is configured to receive (be driven by) the supply of electric power from a battery 9 inside the battery pack 8 and in order to drive and control the motor 10. As shown in FIG. 2, the motor-drive unit 30 comprises a drive circuit 32, a gate circuit 34, the control circuit (control unit) 36, and a regulator 40. It is noted that, in the present embodiment, the motor 10 is a three-phase brushless motor.

The drive circuit 32 receives the supply of electric power from the battery 9 and supplies an electric current to windings of each phase of the motor 10; in the present embodiment, it is configured as a three-phase full-bridge circuit comprising six switching devices Q1-Q6. It is noted that, in the present embodiment, each of the switching devices Q1-Q6 is a MOSFET.

In the drive circuit 32, the three switching devices Q1-Q3 are provided as so-called high-side switches between the terminals U, V, W of the motor 10 and a power supply line, which is connected to a positive-electrode side of the battery 9.

In addition, the other three switching devices Q4-Q6 are provided as so-called low-side switches between the terminals U, V, W of the motor 10 and a ground line, which is connected to a negative-electrode side of the battery 9.

The gate circuit 34 turns ON and OFF each of the switching devices Q1-Q6 within the drive circuit 32 in accordance with a control signal output from the control circuit 36, thereby sequentially supplying electric current to the windings of every phase of the motor 10, thus rotating the motor 10.

The control circuit 36 comprises a microcomputer (a microcontroller), which includes a CPU, ROM, RAM, etc. In addition, nonvolatile memory 38 is also provided in the control circuit 36 and is designed for storing, as usage history information (or simply "history information" below), the state (condition) and the usage state of the motor 10 and the battery 9, which serve as restriction parameters that will be further described below.

For this purpose, a battery-voltage-detection part 42, which detects the battery voltage, an electric-current detection circuit 44, which detects the electric current flowing to the motor 10, and a temperature sensor 48, which detects the temperature of the motor-drive unit 30 (hereinbelow, called the controller temperature), are provided in the motor-drive unit 30.

Furthermore, each of these parts, as well as the drive SW 18, the main power-supply SW 21, the state-indication part 22, and the oil-detection part 28 described above, are connected to the control circuit 36.

A rotation sensor 50, which is designed for detecting a rotational position and a rotational speed of the motor 10, and a temperature sensor 52, which is designed for detecting the temperature of the motor 10 (hereinbelow, called the motor temperature), are provided on the motor 10, and each of these sensors is likewise connected to the control circuit 36.

In addition, a monitor circuit (not shown), which monitors the state (temperature, cell voltage, and the like) of the battery 9 and outputs a stop signal AS (auto stop) that stops the electric discharge from the battery 9 when an abnormality occurs, is provided in the battery pack 8.

Furthermore, a data-communication part 46, which relays communications between the monitor circuit of the battery pack 8 and the control circuit 36, is provided in the motor-drive unit 30. Consequently, it is possible, via the data-communication part 46, for the control circuit 36 to stop the drive of the motor 10 upon receiving the stop signal AS from the battery pack 8, to acquire the state (information concerning the state or condition) of the battery 9, etc.

The regulator 40 receives the supply of electric power from the battery 9, generates a power-supply voltage Vcc (a DC constant voltage) for operating the control circuit 36, and supplies electric power (current) to the internal circuitry of the motor-drive unit 30, including the control circuit 36.

When the main power-supply SW 21 changes to the ON state, the regulator 40 starts up and starts the supply of power to the control circuit 36. As a result of this, the control circuit 36 starts up and executes a control process, in order to drive (energize) the motor 10 in accordance with the operation (e.g., trigger pulling) of the drive SW 18.

In addition, after startup, when the drive SW 18 is turned OFF (e.g., the trigger is released), the control circuit 36 ends the control process; subsequently, the operation of the regulator 40 is automatically stopped unless the drive SW 18 is turned ON within a prescribed (e.g., predetermined) time. It is noted that, when the operation of the regulator 40 is stopped, then supply of electric power to the control circuit 36 is cut off, and therefore the operation of the control circuit 36 also stops.

Figure 3:
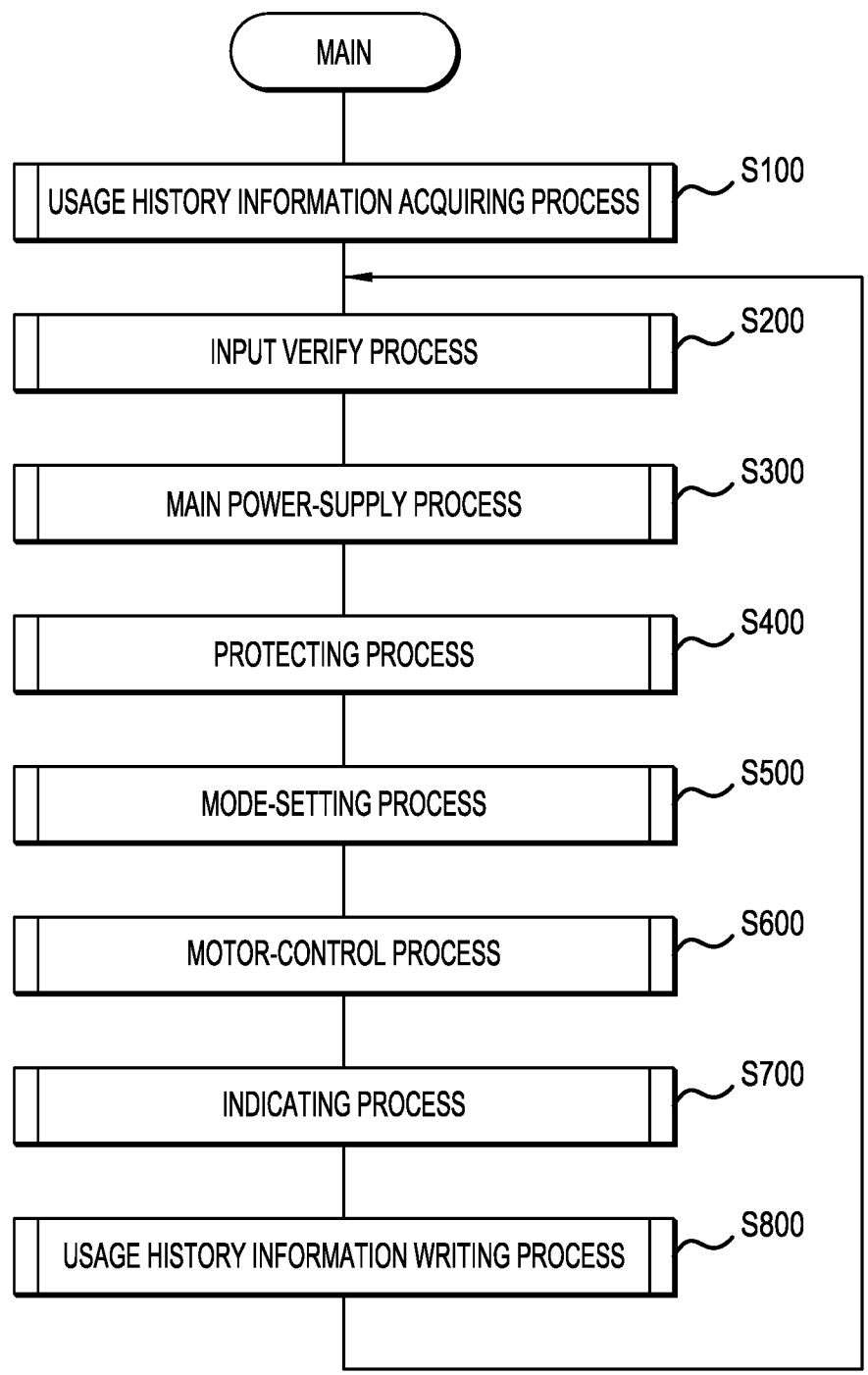
FIG. 3 is a flow chart that shows a control process that is performed by a control circuit (control unit or controller) of the embodiment of FIG. 1.

Next, a representative, non-limiting control process (algorithm), which is executed by the control circuit 36 to control the motor 10, will be explained. As shown in FIG. 3, after startup, the control circuit 36 first acquires in S100 various history information stored in the memory 38 and thereafter repetitively executes the processes of S200-S800.

That is, in S200, an input-verifying process is executed that verifies inputs from the switches, the sensors, and the like described above or from the battery pack 8. In S300, a main power-supply process is executed that detects that the main power-supply SW 21 has changed to the ON (operation) state and switches the ON/OFF state of the main power supply.

In addition, in S400, a protecting process is executed that, to protect the battery pack 8, the motor 10, and the motor-drive unit 30, detects abnormalities (errors) thereof. In S500, a mode-setting process is executed in which, when usage of the chain saw 2 in the power mode has been commanded (selected) by the operation (e.g., manual manipulation, such as pressing) of the main power-supply SW 21, it is determined whether the chain saw 2 is drivable in the power mode; if drivable, then the power mode is set.

It is noted that the power mode is an operating mode in which the energy supplied to drive the motor 10 is larger than in the normal operating mode (normal mode) of the chain saw 2. In the present embodiment, it is set such that the output restriction during drive of the motor 10 is removed (in other words, prohibited or otherwise omitted).

That is, in the normal mode, an upper limit of the output current to the motor 10 is imposed in order to protect the battery 9, and the like from over-discharging, over-heating or otherwise being permanently damaged. Thus, by removing this restriction on the output current in the power mode, the motor 10 can be driven with greater energy.

Continuing to S600, when the drive switch 18 changes to the ON state and a drive (energizing) command of the motor 10 has been input (e.g., the trigger is pulled), the motor 10 is driven and controlled in the operating mode (the power mode or the normal mode) that was set (selected) in S500.

Continuing to S700, an indicating process is executed that indicates the ON/OFF state of the main power supply, the currently set operating mode, an error state (if any), and the like. It is noted that, in this indication, the states are indicated in red, green, or yellow by turning ON or flashing one or both of the two LEDS provided on the state-indication part 22.

Lastly, in S800, various history information are updated and then the process proceeds to S200.

The processing operations in the above S100-S800 will now be sequentially explained below in greater detail.

Figure 4:
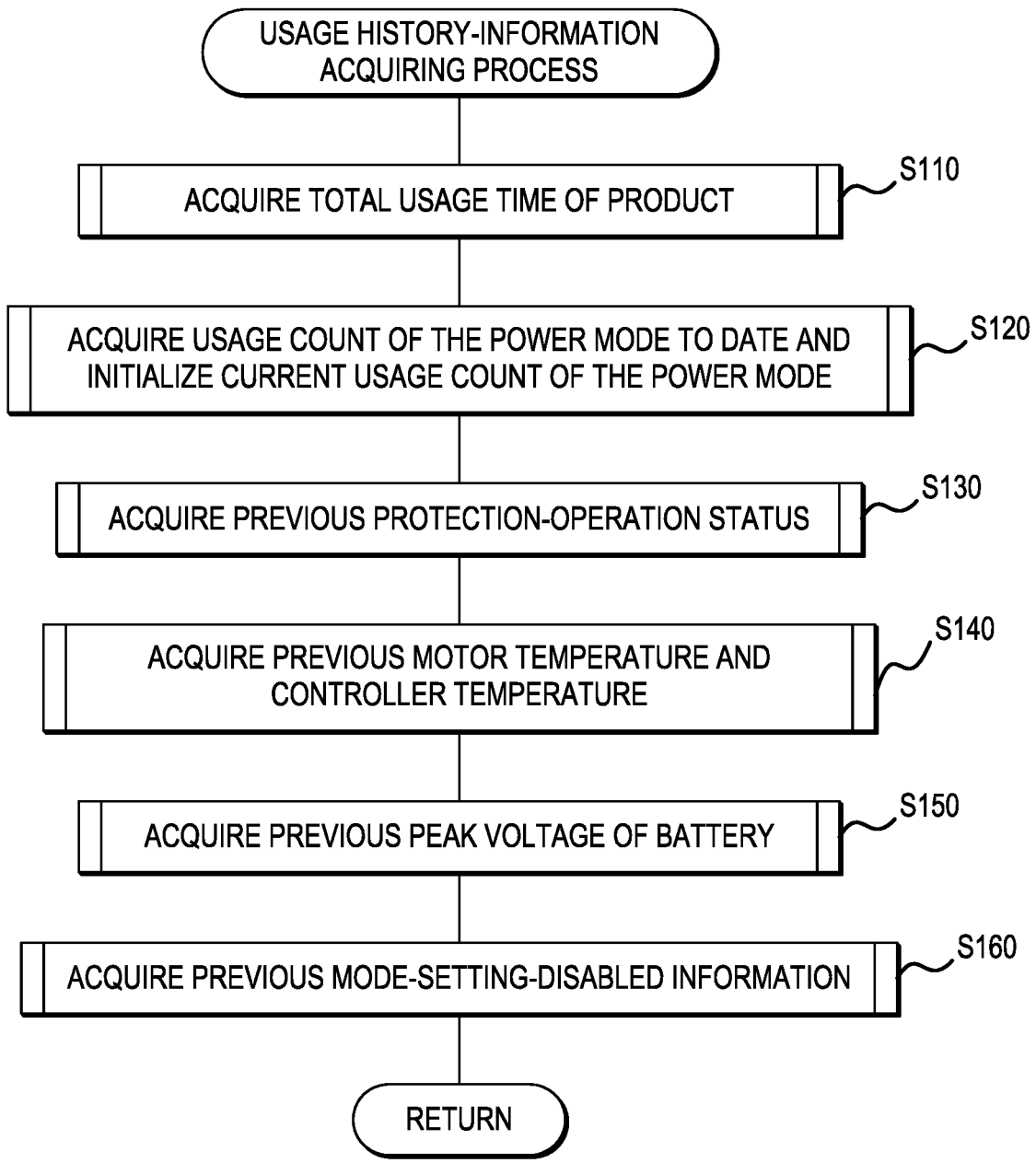
FIG. 4 is a flow chart that shows a history-information acquiring process.

In the history-information acquiring process of S100 that is shown in more detail in FIG. 4, in S110, the total usage time after shipment of the chain saw 2 is acquired from the memory 38 and, in S120, the usage count of the power mode to date is acquired from the memory 38.

This usage count is the usage count since the battery pack 8 was mounted on the chain saw 2; when the usage count is acquired in S120, the acquired usage count is set as the initial value of the usage count used in the subsequent control.

Then, in S130, the previous protection-operation status is acquired from the memory 38; in S140, the previous motor temperature and controller temperature are acquired from the memory 38; and in S150, the previous peak voltage of the battery 9 is acquired from the memory 38.

Lastly, in S160, previous mode-setting-disabled information is acquired from the memory 38, after which the history-information acquiring process ends. It is noted that the mode-setting-disabled information is the previous value of a mode-setting-disabled flag, which is set when transitioning to the power mode is prohibited.

Figure 5:
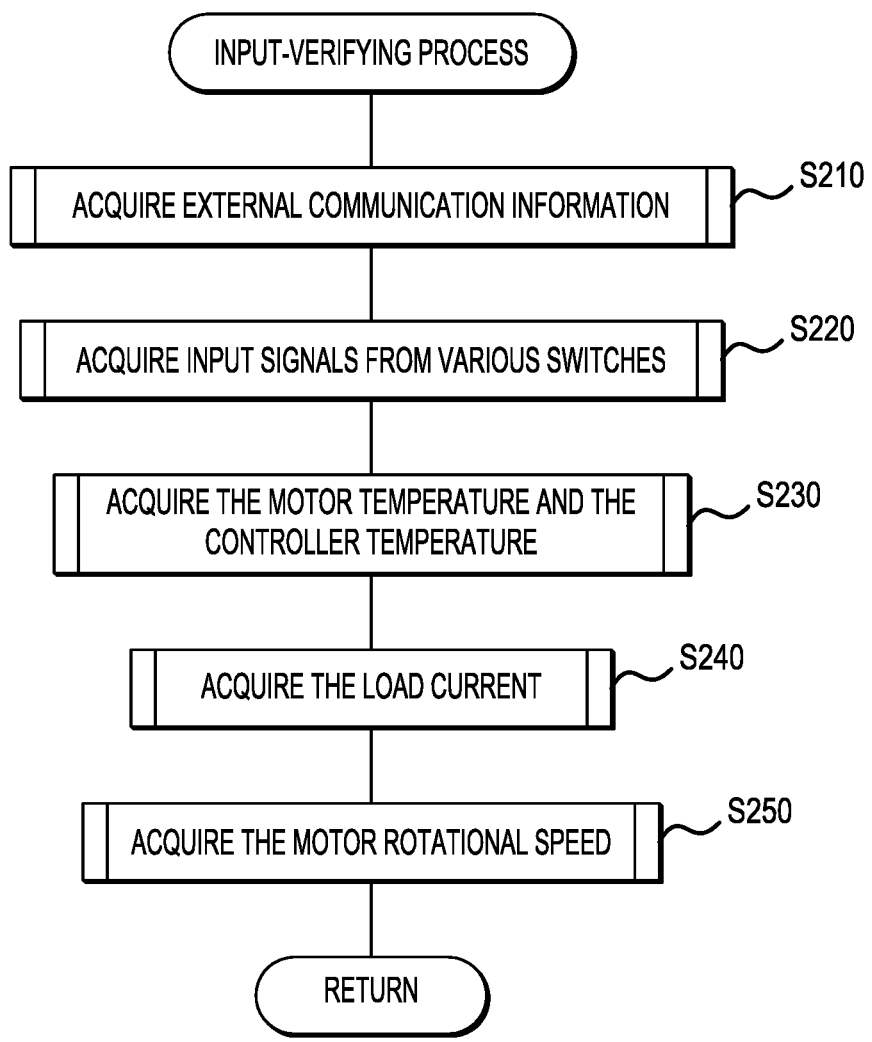
FIG. 5 is a flow chart that shows an input-verifying process.

Next, in the input-verifying process of S200 that is shown in more detail in FIG. 5, external communication information is acquired in S210 via the data-communication part 46. That is, in S210, unique information, such as the type, the serial code, the rated capacity, and the rated voltage of the battery 9; current information, such as the remaining charge, the temperature, and the voltage of the battery 9; and history information, such as the past usage time and the error status, are acquired as the external communication information.

It is noted that the usage time of the battery 9 is used to determine the deterioration state of the battery 9. For this purpose, the usage count may be acquired instead of the usage time of the battery 9. Next, in S220, input signals from the various switches, such as the drive SW 18 and the main power-supply SW 21, are acquired; in S230, the controller temperature and the motor temperature are acquired from the temperature sensors 48, 52, respectively.

In S240, the electric current (presently) flowing from the electric-current detection circuit 44 to the motor 10 (hereinbelow, also called the "load current") is acquired; in S250, the (present) rotational speed of the motor 10 is acquired based on a detection signal from the rotation sensor 50, after which the input-verifying process ends.

Figure 6:
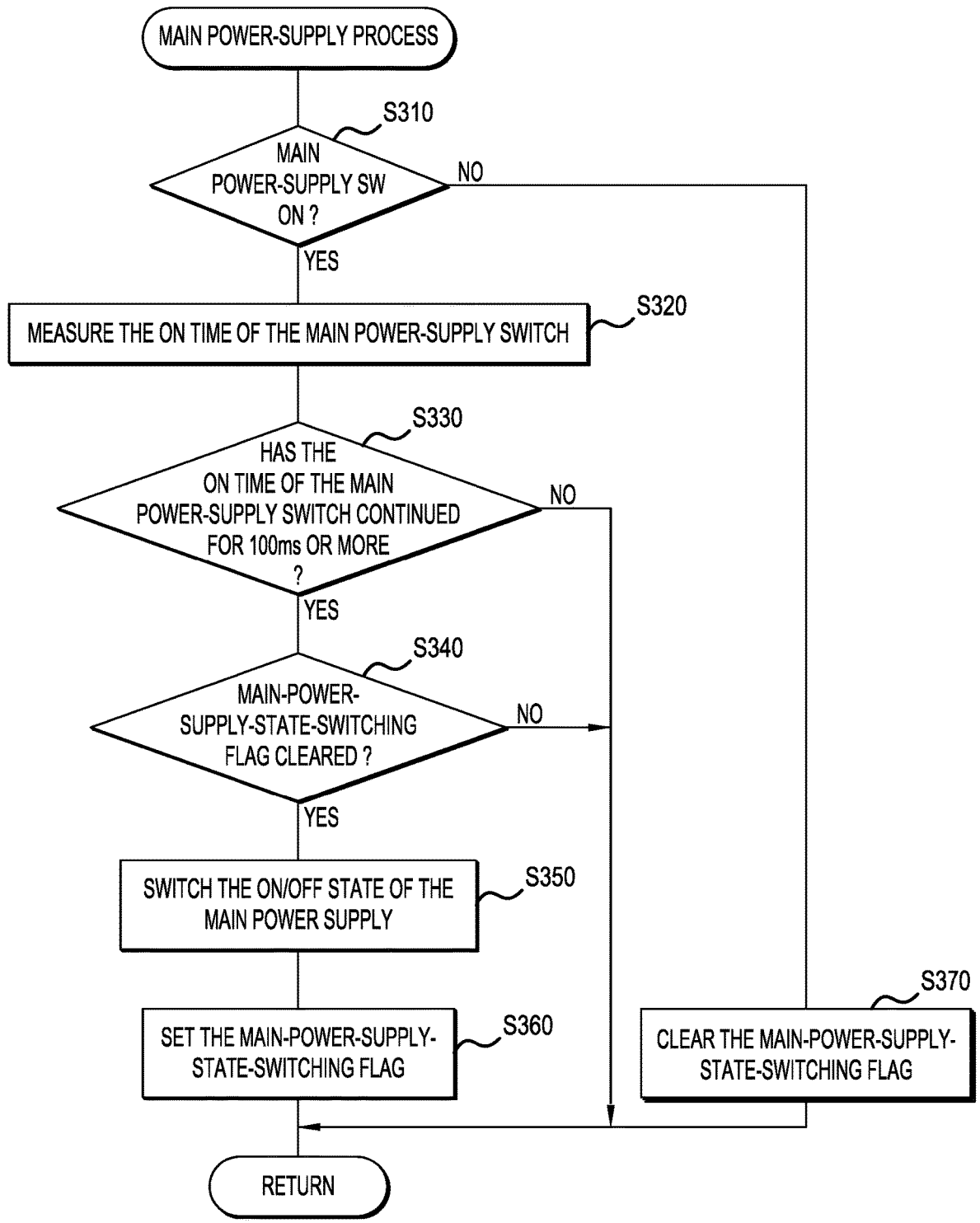
FIG. 6 is a flow chart that shows a main power-supply process.

Next, in the main power-supply process of S300 that is shown in more detail in FIG. 6, it is determined in S310 whether the main power-supply SW 21 is in the ON state; if it is in the ON state, then the process proceeds to S320; it is if not in the ON state, a main-power-supply-state-switching flag is cleared in S370, after which the main power-supply process ends.

In S320, the time during which the main power-supply SW 21 has been operated (pressed) and is in the ON state (hereinbelow, called the ON time) is measured; continuing to S330, it is determined whether the ON time of the main power-supply SW 21 is a prescribed threshold value (e.g., 100 ms) or greater.

If the ON time of the main power-supply SW 21 is less than the threshold value, then the main power-supply process ends; on the other hand, if the ON time of the main power-supply SW 21 is the threshold value or more, then it is determined that the main power-supply SW 21 is being operated, and the process proceeds to S340.

In S340, it is determined whether the main-power-supply-state-switching flag is currently cleared; if it is cleared, then the process proceeds to S350; if it is not cleared, then the main power-supply process ends.

In S350, it is determined that the power supply has been turned ON or OFF by operation (manipulation, manually moving) of the main power-supply SW 21 and the ON/OFF state of the main power supply is switched (in other words, reversed); in S360, the main-power-supply-state-switching flag is set, after which the main power-supply process ends.

It is noted that the main-power-supply-state-switching flag is cleared in the interval from after the main power-supply SW 21 is operated until the ON/OFF state of the main power-supply is switched in S350, and thereby the main-power-supply-state-switching flag is used to switch the main power-supply state only one time after the main power-supply SW 21 is operated.

Figure 7:
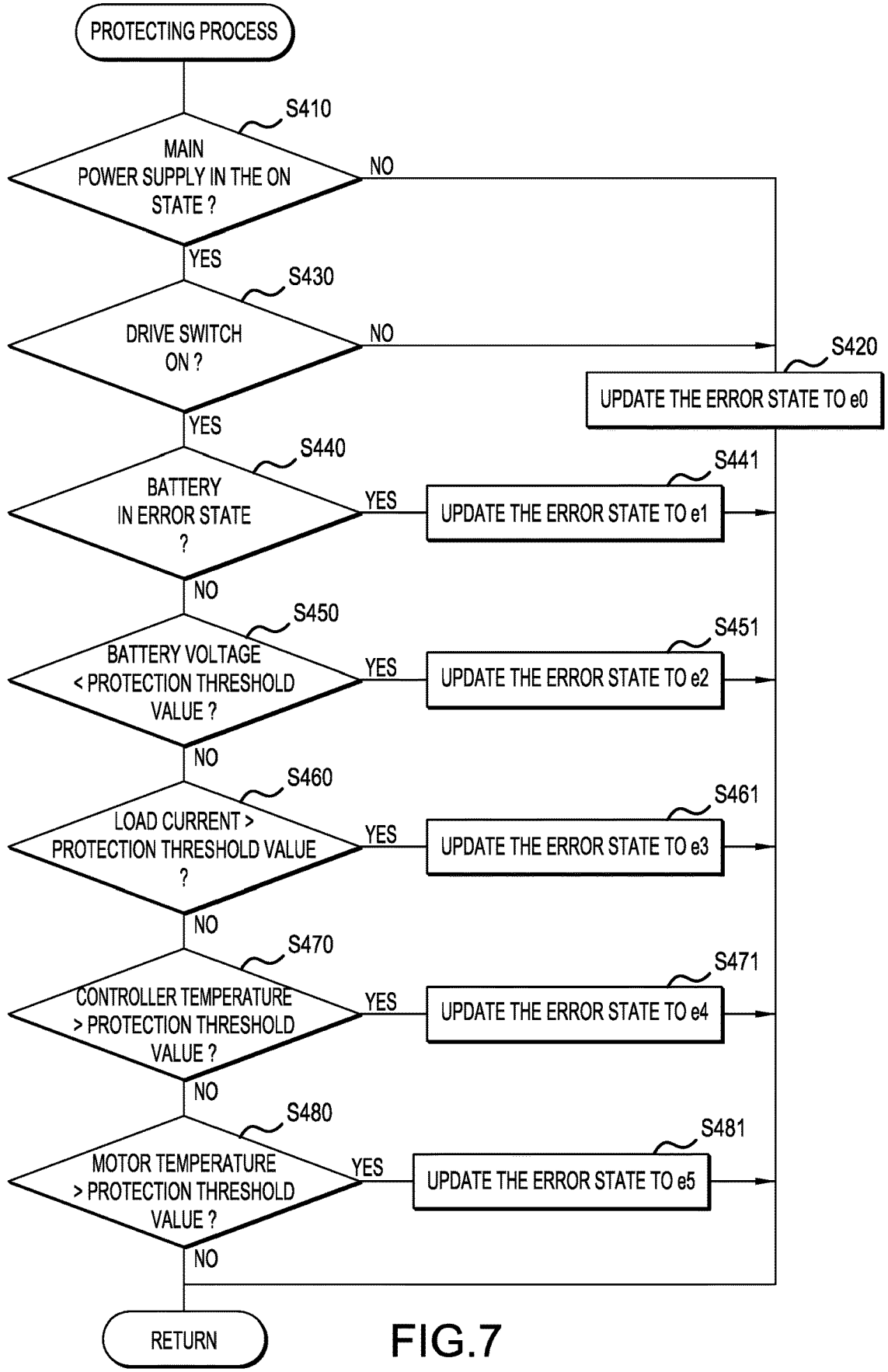
FIG. 7 is a flow chart that shows a protecting process.

Next, in the protecting process of S400 that is shown in more detail in FIG. 7, it is determined in S410 whether the main power supply is turned ON. If the main power supply is not turned ON, then, in S420, the error state is set to "e0," after which the protecting process ends. It is noted that the error state "e0" indicates a no-error state; here, the error state is initialized to "e0" in the interval from after startup of the control circuit 36 to the main power supply being switched ON.

On the other hand, if it is determined in S410 that the main power supply is turned ON, then the process proceeds to S430, in which it is determined whether the drive SW 18 is in the ON state. If the drive SW 18 is not in the ON state, then the process of S420 is executed, after which the protecting process ends. On the other hand, if the drive SW 18 is in the ON state, then the process proceeds to S440, in which it is determined whether the battery 9 is in the error state. It is noted that this determination is made based on the battery information acquired from the battery pack 8.

In S440, if it is determined that the battery 9 is in the error state, then the battery error is stored in S441 by setting the error state to "e1," after which the protecting process ends. On the other hand, if it is determined in S440 that the battery 9 is not in the error state, then the process proceeds to S450, in which it is determined whether the battery voltage is lower than a voltage protection threshold value.

If the (detected) battery voltage is lower than the voltage protection threshold value, then a battery-voltage abnormality is stored in S451 by setting the error state to "e2," after which the protecting process ends; on the other hand, if the battery voltage is the voltage protection threshold value or greater, then the process proceeds to S460.

In S460, it is determined whether the load current exceeds a load current protection threshold value. If the load current exceeds the load current protection threshold value, then, in S461, a load-current abnormality is stored by setting the error state to "e3," after which the protecting process ends; on the other hand, if the load current does not exceed the load current protection threshold value, then the process proceeds to S470.

In S470, it is determined whether the controller temperature exceeds a controller temperature protection threshold value. If the controller temperature exceeds the controller temperature protection threshold value, then a controller-temperature abnormality is stored in S471 by setting the error state to "e4," after which the protecting process ends.

On the other hand, if it is determined in S470 that the controller temperature does not exceed the controller temperature protection threshold value, then the process proceeds to S480, in which it is determined whether the motor temperature exceeds a motor temperature protection threshold value. If the motor temperature exceeds the motor temperature protection threshold value, then a motor-temperature abnormality is stored in S481 by setting the error state to "e5," after which the protecting process ends; on the other hand, if the motor temperature does not exceed the motor temperature protection threshold value, then the protecting process ends.

As a result, when the main power supply changes to the ON state, the drive SW 18 is operated and the drive of the motor 10 starts in the protecting process, it is noted that the error state is held at "e0" when all of the parameters (measured conditions) mentioned above are normal. On the other hand, if any of the above temperature or current parameters exceeds its protection threshold value or if the battery voltage is lower than its protection threshold value, then the error state is set to one of "e1" to "e5."

Figure 8:
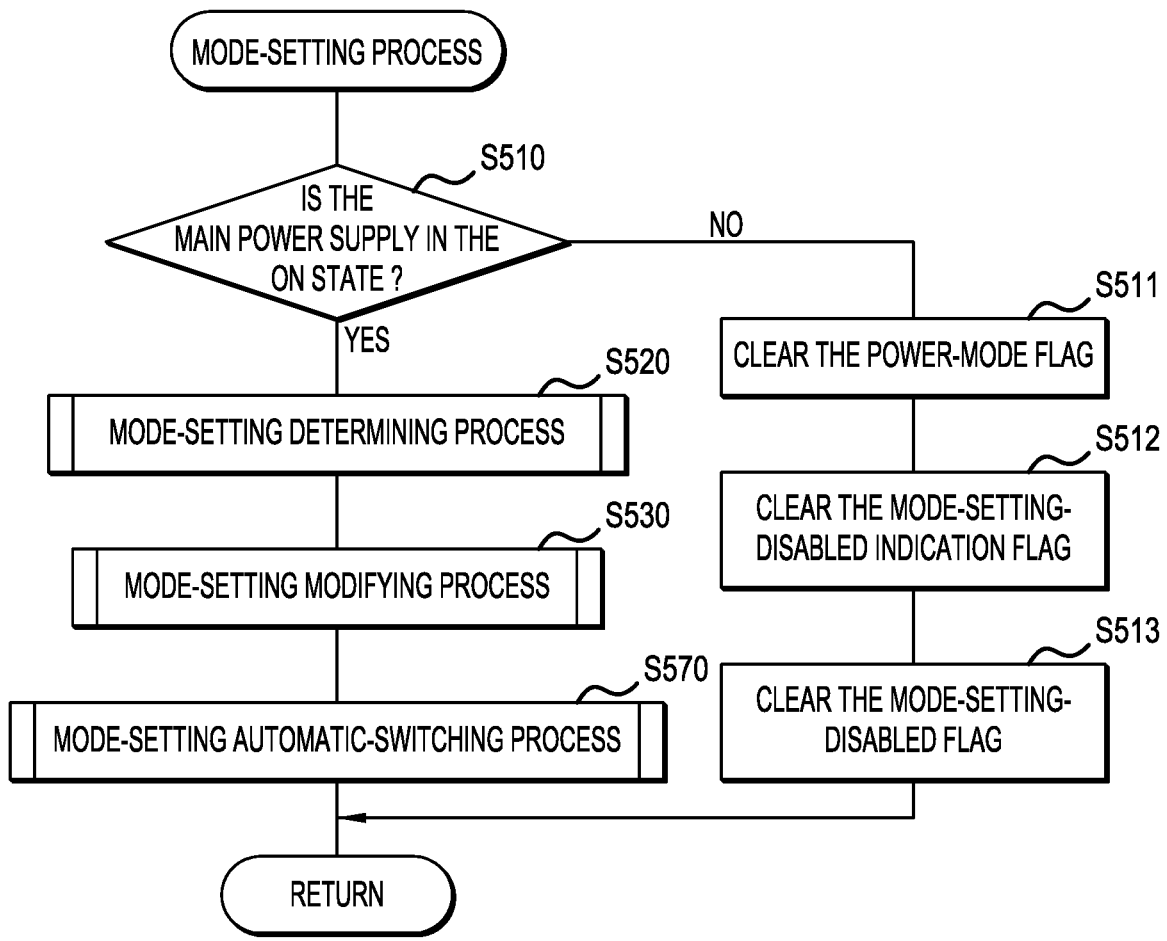
FIG. 8 is a flow chart that shows a mode-setting process.

Next, in the mode-setting process of S500 that is shown in more detail in FIG. 8, it is determined in S510 whether the main power supply is turned ON; if the main power supply is not turned ON, then the processes of S511, S512, S513 are executed, after which the mode-setting process ends.

The processes executed in S511, S512, and S513 are for initializing (clearing) a power-mode flag, a mode-setting-disabled-indication flag, and the mode-setting-disabled flag, respectively. It is noted that the power-mode flag is a flag that is set when the current operating mode is the power mode. In addition, the mode-setting-disabled-indication flag is a flag that is set when switching from the operating mode to the power mode is prohibited and is used to indicate, via the state-indication part 22, that setting the mode is disabled.

On the other hand, if it is determined in S510 that the main power supply is turned ON, then the processes of S520, S530, and S570 are executed, after which the mode-setting process ends. In S520, a mode-setting determining process is executed that determines whether the operating mode of the control circuit 36 can be set to the power mode and, based thereupon, it sets or clears the mode-setting-disabled flag.

In S530, a mode-setting modifying process is executed that determines whether, starting from the ON time of the main power-supply SW 21 during startup of the control circuit 36, to set the operating mode of the control circuit 36 to the power mode or to the normal mode, and, based thereupon, it sets or clears the power-mode flag.

Furthermore, in S570, a mode-setting automatic-switching process is executed in which, when the power mode has been set by the process in S530, the duration of the power mode, the load current, and the states of the battery 9, the motor 10, and the like are monitored. If a power mode prohibited condition arises, then the power mode setting is terminated.

Next, the mode-setting determining process, the mode-setting modifying process, and the mode-setting automatic-switching process executed in S520, S530, and S570 will be explained.

Figure 9:
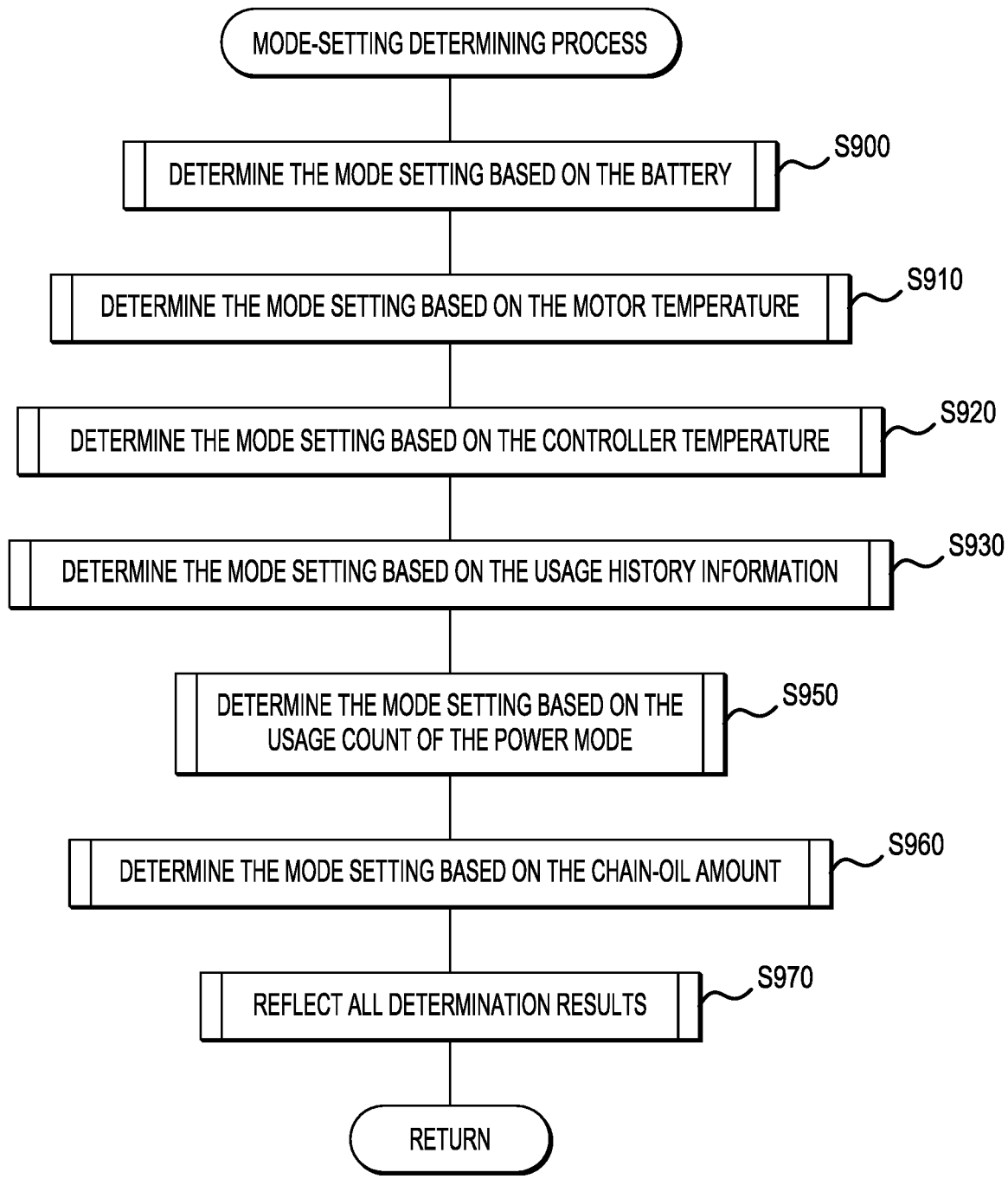
FIG. 9 is a flow chart that shows a mode-setting determining process.

In the mode-setting determining process as shown in FIG. 9, the mode-setting determining process is executed in S900 based on the battery 9; in S910, the mode-setting determining process is executed based on the motor temperature; and in S920, the mode-setting determining process is executed based on the controller temperature.

In addition, in S930, the mode-setting determining process is executed based on the history information; in S950, the mode-setting determining process is executed based on the usage count of the power mode; and in S960, the mode-setting determining process is executed based on the amount of chain oil.

Then, an all-determination-results reflecting process is executed at the end in S970 that, based on the results of the determinations made in S900-S960, determines whether the power mode can be set and, based on those determinations, the mode-setting-disabled flag is set or cleared, after which the mode-setting determining process ends.

Figure 10:
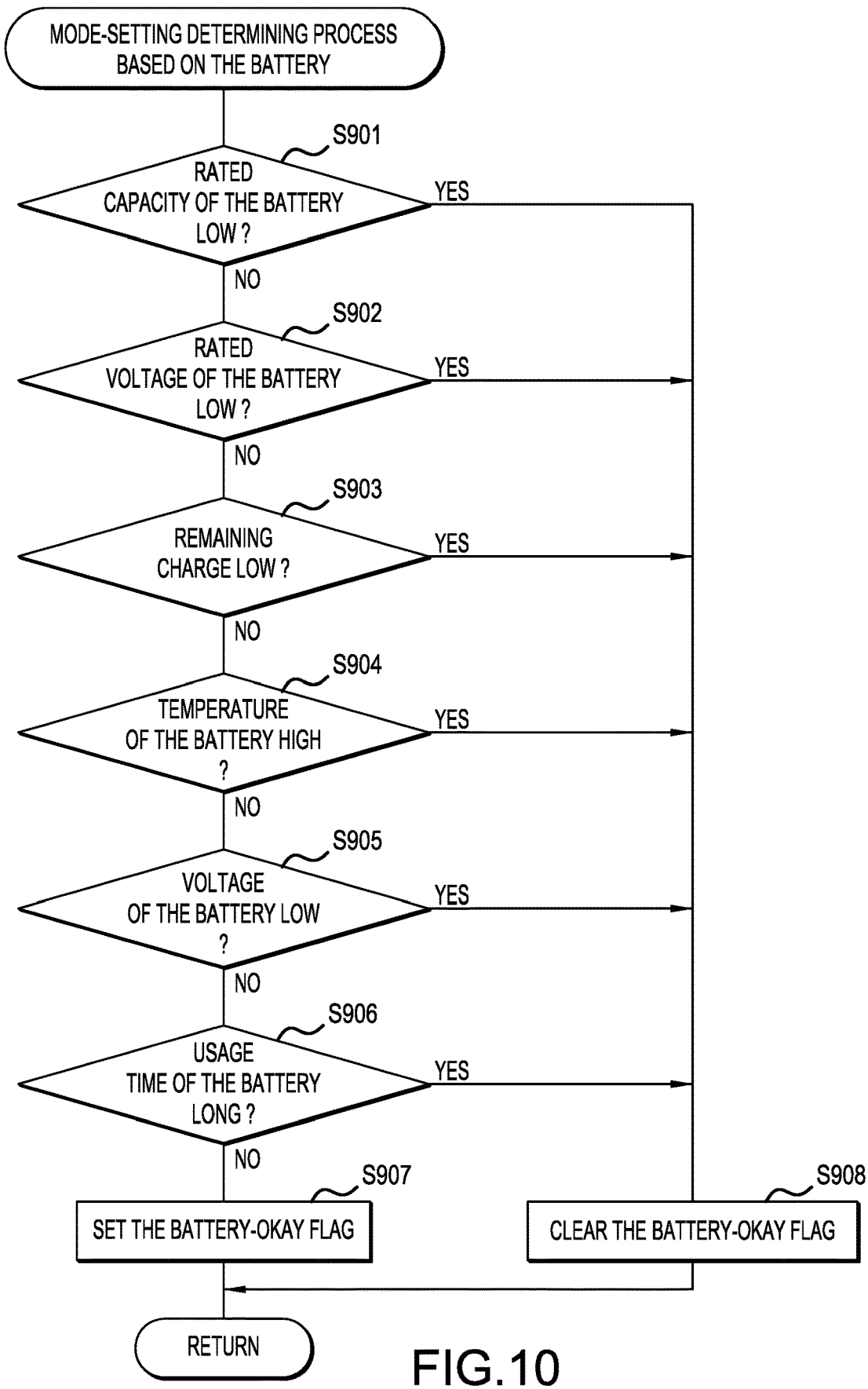
FIG. 10 is a flow chart that shows a mode-setting determining process that is executed based on a battery.

In this embodiment, the mode-setting determining process of S900 that is based on the battery 9 may be implemented by the procedure shown in FIG. 10. That is, when this process is started, it is first determined in S901 whether the rated capacity of the battery 9 is smaller than a capacity threshold value. If the rated capacity is smaller than the capacity threshold value, then a battery-OK flag is cleared in S908 to prohibit the setting of the power mode (because it is considered that the battery 9 would immediately or too quickly discharge and deteriorate in the power mode), after which the mode-setting determining process ends.

On the other hand, if it is determined in S901 that the rated capacity of the battery 9 is the capacity threshold value or more, then the process proceeds to S902, in which it is determined whether the rated voltage of the battery 9 is lower than a voltage threshold value. If the rated voltage is lower than the voltage threshold value, then the process proceeds to S908, in which the battery-OK flag is cleared (because it is again considered that the battery 9 would immediately or too quickly discharge and deteriorate in the power mode), after which the mode-setting determining process ends.

On the other hand, if it is determined in S902 that the rated voltage of the battery 9 is the voltage threshold value or more, then the process proceeds to S903, in which it is determined whether the currently remaining charge of the battery 9 is less than a threshold value. If the remaining charge of the battery 9 is less than the threshold value, then the process proceeds to S908, in which the battery-OK flag is cleared (because it is again considered that the battery 9 would immediately or too quickly discharge and deteriorate in the power mode), after which the mode-setting determining process ends.

On the other hand, if it is determined in S903 that the remaining charge of the battery 9 is the threshold value or more, then the process proceeds to S904, in which it is determined whether the current battery temperature is high, i.e. whether it is a temperature threshold value or more. If the battery temperature is the temperature threshold value or more, then the process proceeds to S908, in which the battery-OK flag is cleared (because it is considered that the battery 9 will overheat and deteriorate if the motor 10 is driven in the power mode in this high-temperature battery state), after which the mode-setting determining process ends.

On the other hand, if it is determined in S904 that the battery temperature is lower than the temperature threshold value, then the process proceeds to S905, in which it is determined whether the present (measured) battery voltage is lower than a present voltage threshold value. If the battery voltage is lower than the present voltage threshold value, then the process proceeds to S908, in which the battery-OK flag is cleared (because it is considered that the battery 9 will over-discharge and deteriorate if the motor 10 is driven in the power mode in this low-voltage battery state), after which the mode-setting determining process ends.

On the other hand, if it is determined in S905 that the battery voltage is the present voltage threshold value or more, then the process proceeds to S906, in which it is determined whether the usage time of the battery 9 is longer than a usage time threshold value. If the usage time of the battery 9 is longer than the usage time threshold value, then the process proceeds to S908, in which the battery-OK flag is cleared (because it is considered that the battery 9 will deteriorate if the motor 10 is driven in the power mode), after which the mode-setting determining process ends.

On the other hand, if it is determined in S906 that the usage time of the battery 9 is the usage time threshold value or less, then it is determined that the battery 9 can be used in the power mode. Therefore, the process proceeds to S907, in which the battery-OK flag is set, after which the mode-setting determining process ends.

It is noted that, although the deterioration state of the battery 9 is determined in S906 based on the usage time of the battery 9 in the present embodiment, the deterioration state of the battery 9 may, in addition or instead, be determined based on the usage count of the battery 9.

In addition, although it is determined in S901 whether the battery 9 can be used in the power mode based on the rated capacity of the battery 9 in the present embodiment, the number of parallel cells constituting the battery 9 may be used instead of the rated capacity.

That is, because the rated capacity of the battery 9 is determined by the number of parallel cells, it is possible to obtain the number of parallel cells from the battery pack 8 in S210, and then it may be determined in S901 whether the battery 9 can be used in the power mode based on the obtained number of parallel cells.

Next, in the mode-setting determining process of S910 that is based on the motor temperature and in the mode-setting process of S920 that is based on the controller temperature, it is determined whether the motor temperature or the controller temperature exceeds the threshold values thereof.

If the motor temperature or the controller temperature exceeds its threshold value, setting of the power mode is prohibited by clearing a motor-temperature-OK flag or a controller-temperature-OK flag, respectively.

On the other hand, if both the motor temperature and the controller temperature are the threshold values thereof or less, then the motor 10 and the motor-drive unit 30 are within their normal-temperature range. Therefore, setting of the power mode is enabled by setting the motor-temperature-OK flag and the controller-temperature-OK flag.

Figure 11:
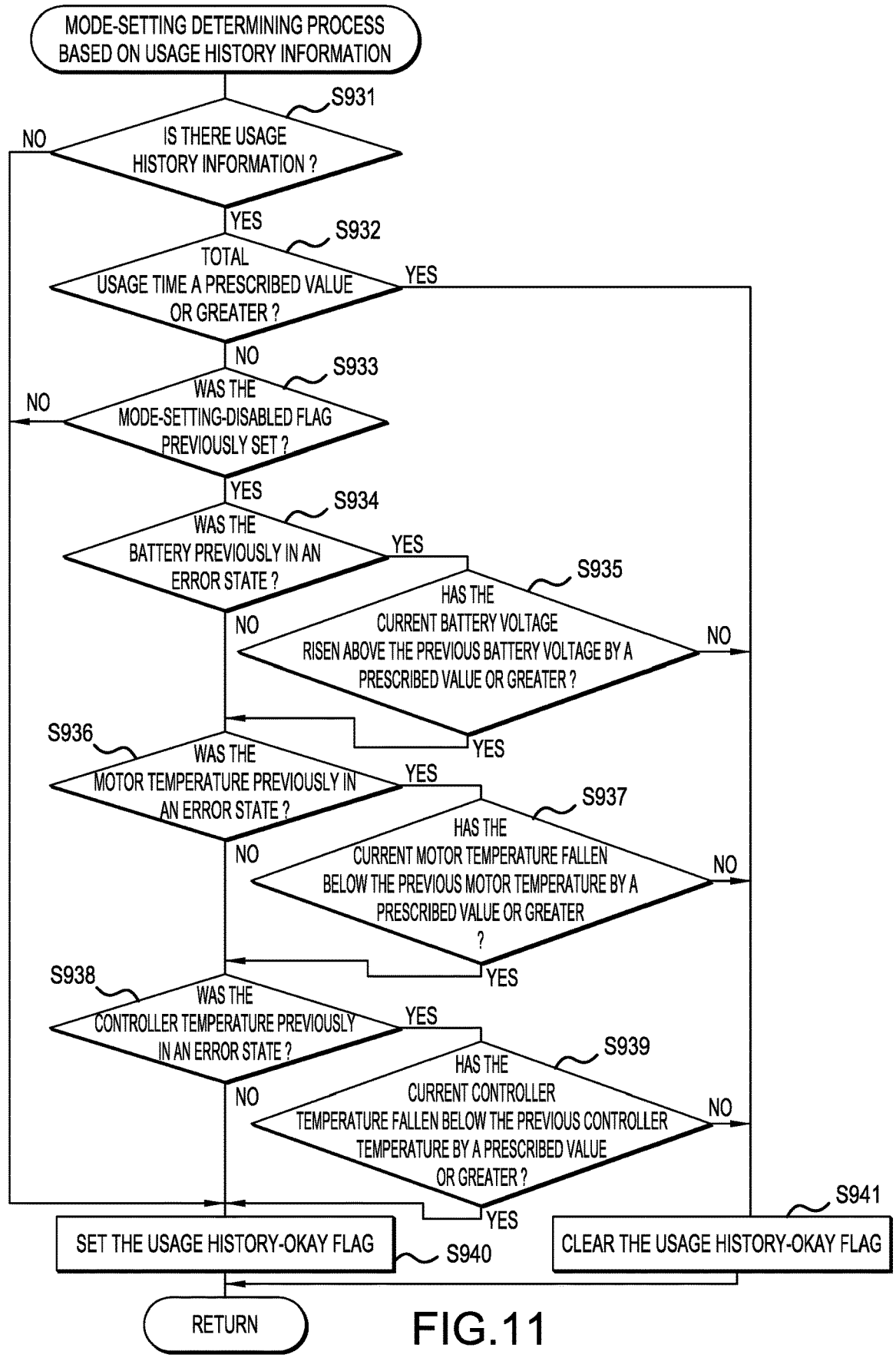
FIG. 11 is a flow chart that shows a mode-setting determining process that is executed based on history information.

Next, in the mode-setting determining process of S930 that is based on the history information, as shown in FIG. 11, it is first determined in S931 whether there is history information. Furthermore, if there is history information, then the process proceeds to S932; on the other hand, if there is no history information, then the process proceeds to S940.

In S932, it is determined whether the total usage time of the chain saw 2 is a prescribed value or greater. If the total usage time is the prescribed value or greater, then it is determined that the chain saw 2 is approaching its product life (i.e. approaching the end of its usable service life), and therefore the process proceeds to S941. Furthermore, in S941, a usage history-information-OK flag is cleared in order to prohibit setting of the power mode, after which the mode-setting determining process ends.

On the other hand, if it is determined in S932 that the total usage time is less than the prescribed value, then the process proceeds to S933, in which it is determined whether setting of the power mode was previously prohibited, i.e. whether the mode-setting-disabled flag was previously set.

If the mode-setting-disabled flag was not previously set, then the process proceeds to S940; on the other hand, if the mode-setting-disabled flag was previously set, then the process proceeds to S934. In S934, it is determined whether the battery 9 was previously in the error state of "e1". If the battery 9 was previously in the error state, then the process proceeds to S935; otherwise, the process proceeds to S936.

In S935, it is determined whether the current (presently measured) battery voltage has risen above the previous battery voltage by a prescribed value or greater. If the current battery voltage has risen above the previous battery voltage by the prescribed voltage or greater, then the process proceeds to S936 because it is considered that the battery 9 has been charged or the battery pack 8 has been exchanged with a charged one; otherwise, the process proceeds to S941, in which the usage history-information-OK flag is cleared.

Next, it is determined in S936 whether the motor temperature was previously in the error state of "e5"; if the motor temperature was previously in the error state, then the process proceeds to S937; otherwise, the process proceeds to S938.

In S937, it is determined whether the current motor temperature has fallen below the previous motor temperature by a prescribed value or greater. If the motor temperature has fallen below the previous motor temperature by the prescribed temperature or greater, then the process proceeds to S938 because it is determined that the motor 10 has cooled and can be safely driven in the power mode; otherwise, the process proceeds to S941, in which the usage history-information-OK flag is cleared.

Next, it is determined in S938 whether the controller temperature was previously in the error state "e4"; if the controller temperature was previously in the error state, then the process proceeds to S939; otherwise, the process proceeds to S940.

In S939, it is determined whether the current (presently measured) controller temperature has fallen below the previous controller temperature by a prescribed value or greater. If the controller temperature has fallen below the previous controller temperature by the prescribed temperature or greater, then the process proceeds to S940 because it is determined that the motor-drive unit 30 has cooled and that the motor 10 can be driven in the power mode; otherwise, the process proceeds to S941, in which the usage history-information-OK flag is cleared.

Then, in S940, because all of the above usage history information is normal and the motor 10 can be driven in the power mode, the history-information-OK flag is set and the setting of the power mode is enabled. Then, when the history-information-OK flag is set in S940, the mode-setting process ends.

Figure 12:
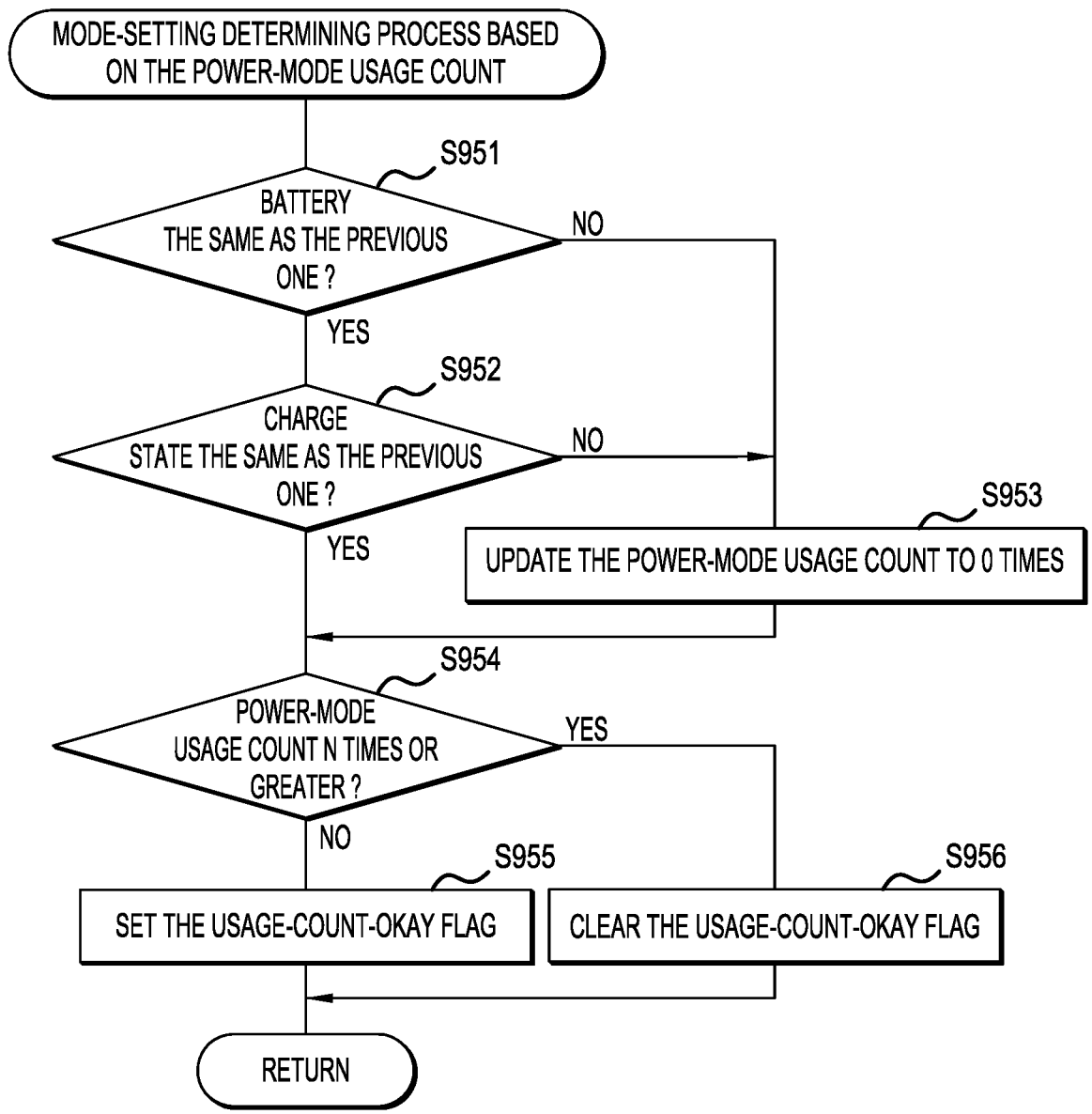
FIG. 12 is a flow chart that shows a mode-setting determining process that is executed based on a power-mode usage count.

Next, the mode-setting determining process based on the power-mode usage count of S950 (FIG. 9) may be implemented by the procedure shown in FIG. 12. That is, in the mode-setting determining process, it is first determined in S951 whether the battery 9 is the same battery as the previous battery based on the type, serial code, and the like of the battery 9 acquired from the battery pack 8. If the battery 9 is the same as the previous one, then the process proceeds to S952, in which it is determined whether the charge state (i.e., the remaining charge, the battery voltage, or the like) of the battery 9 is the same as the previous charge state.

If it is determined in S951 or S952 that the battery 9 or the charge state thereof is not the same as the previous one, then the process proceeds to S953, in which the power-mode usage count of the battery 9 is updated to 0 because it is determined that the battery pack 8 has been exchanged or that the battery 9 has been charged.

Furthermore, if it is determined in S952 that the charge state of the battery 9 is the same as the previous charge state, or when the usage count is set to the initial value (0 times) in S953, then the process proceeds to S954, in which it is determined whether the power-mode usage count of the battery 9 is a prescribed count (N times) or greater.

In S954, if it is determined that the usage count is N times or greater, then the process proceeds to S956, in which, to prevent the battery 9 from over-discharging, a usage-count-OK flag is cleared to prohibit setting of the power mode, after which the mode-setting determining process ends.

On the other hand, if it is determined in S954 that the usage count is fewer than N times, then the process proceeds to S955, in which setting of the power mode is enabled by setting the usage-count-OK flag, after which the mode-setting determining process ends.

Next, in the mode-setting determining process based on the amount of chain oil of S960, the amount of chain oil is acquired from the oil-detection part 28 and, based thereupon, it is determined whether the amount of chain oil exceeds a threshold value.

If the amount of chain oil exceeds the threshold value, then an oil-OK flag is set, because it is determined that the chain oil is sufficient and there will be no problem even if the motor 10 is driven in the power mode, and thereby setting of the power mode is enabled.

On the other hand, if the amount of chain oil is the threshold value or less, then there is a possibility that the amount of chain oil will become insufficient in the power mode. Therefore, the oil-OK flag is cleared, and thereby setting of the power mode is prohibited. It is noted that, in the present embodiment, the mode-setting determining process is executed based on the amount of chain oil because the electric work machine is the chain saw 2. Therefore, if the chain oil is insufficient, the power loss will become large and the performance of the main body will not be realized.

In contrast, if the electric work machine is, e.g., a dust collector or a lawn mower, then the mode-setting determining process may be executed such that setting of the power mode is prohibited or enabled in accordance with the dust-collection state or the grass-collection state, respectively.

That is, in a dust collector or a lawn mower, a housing part (or flexible collection bag) that stores waste, grass, or the like is provided. If waste, grass, or the like excessively accumulates in this housing part (or flexible collection bag), then the dust-collecting performance or the grass-cutting performance will decrease. Consequently, in these types of electric work machines, by prohibiting the transition to the power mode in accordance with the dust-collection state or the grass-collection state, it is possible to reduce the likelihood of deterioration of the electric work machine caused by driving the motor 10 in the power mode and increasing the load on the electric work machine.

Figure 13:
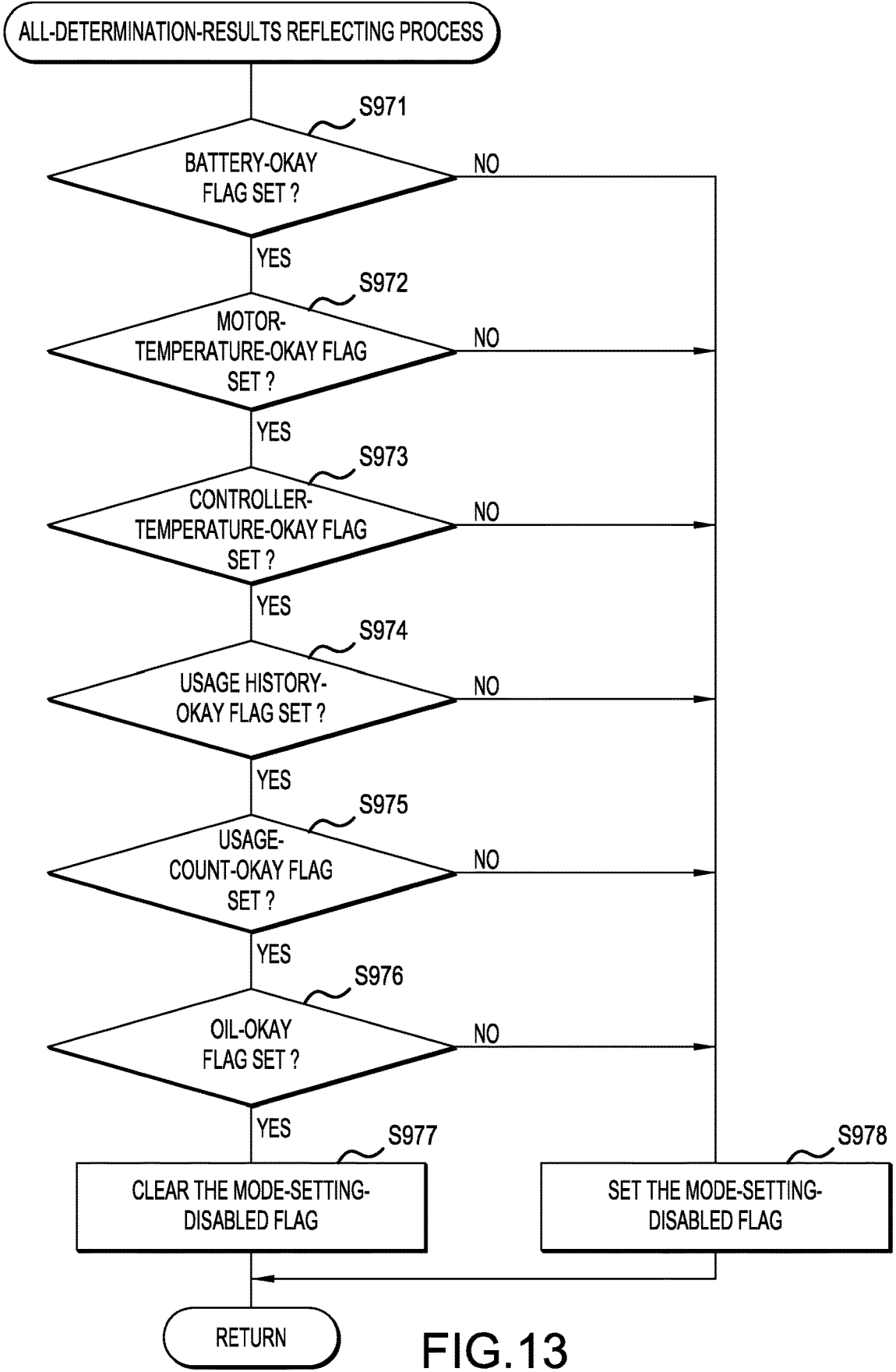
FIG. 13 is a flow chart that shows a process of reflecting all determination results.

Next, the all-determination-results reflecting process of S970 may be implemented by the procedure shown in FIG. 13. That is, this determination process sequentially determines, in S971-S976, whether the battery-OK flag, the motor-temperature-OK flag, the controller-temperature-OK flag, the history-information-OK flag, the usage-count-OK flag, and the oil-OK flag described above are set.

That is, if it is determined by any of the processes executed in S971-S976 that a flag is cleared, then the process proceeds to S978, in which driving of the motor 10 in the power mode is prohibited by setting the mode-setting-disabled flag, after which the reflecting process ends.

On the other hand, if it is determined in all the processes performed in S971-S976 that the flags are set, then the process proceeds to S977, in which driving of the motor 10 in the power mode is enabled by clearing the mode-setting-disabled flag, after which the reflecting process ends.

Figure 14:
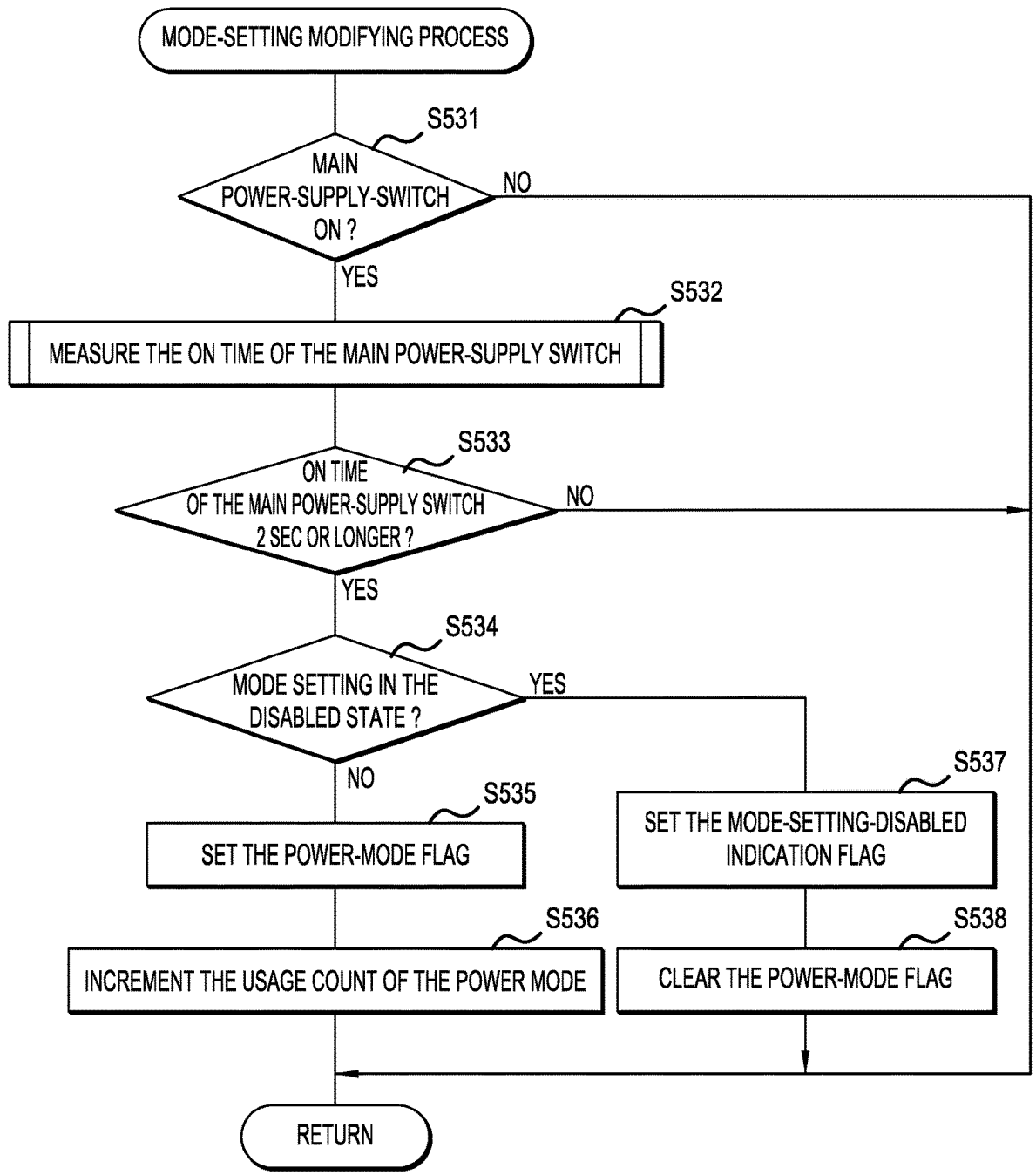
FIG. 14 is a flow chart that shows a mode-setting modifying process.

Next, in the mode-setting modifying process of S530 that is shown in more detail in FIG. 14, it is first determined in S531 whether the main power-supply SW 21 is in the ON state; if the main power-supply SW 21 is not in the ON state, then the mode-setting modifying process ends.

On the other hand, if the main power-supply SW 21 is in the ON state, then the process proceeds to S532, in which the ON time of the main power-supply SW 21 is measured. Then, continuing to S533, it is determined whether the ON time of the main power-supply SW 21 has reached a determination time (e.g., 2 sec) or longer for a power-mode-command determination. If the ON time of the main power-supply SW 21 is the determination time or longer, then the process proceeds to S534; on the other hand, if the ON time of the main power-supply SW 21 is less than the determination time, then the mode-setting modifying process ends.

It is noted that the determination time for a power-mode determination is set to be a sufficiently long time compared with the threshold value used in the operation determination of the main power-supply SW 21 in S330.

Next, in S534, it is determined whether the mode-setting-disabled flag is currently set and whether setting of the power mode is in the disabled state. If it is determined in S534 that the mode-setting-disabled flag is cleared and setting of the power mode is enabled, then the process proceeds to S535, in which the operating mode is set to the power mode by setting the power-mode flag, after which the process proceeds to S536.

Furthermore, the usage count of the power mode is updated in S536 by adding the value 1 to the usage count of the power mode, after which the mode-setting modifying process ends.

On the other hand, if it is determined in S534 that the mode-setting-disabled flag is set and setting of the power mode is prohibited, then the process proceeds to S537, in which the mode-setting-disabled-indication flag is set. Then, continuing to S538, the power-mode flag is cleared, after which the mode-setting modifying process ends.

That is, in the present embodiment, when the main power-supply SW 21 changes to the ON state and the control circuit 36 starts up, if the ON state of the main power-supply SW 21 continues for the prescribed determination time or longer, then the power-mode flag is set conditioned upon the mode-setting-disabled flag being cleared.

Consequently, with regard to the operating mode of the control circuit 36, the power mode is set during startup of the control circuit 36 by a long press (i.e., pressing for a determination time or longer) of the main power-supply SW 21. On the other hand, the normal mode is set during startup of the control circuit 36 by a short press (i.e., pressing for a period shorter than the determination time) of the main power-supply SW 21 at startup.

Figure 15:
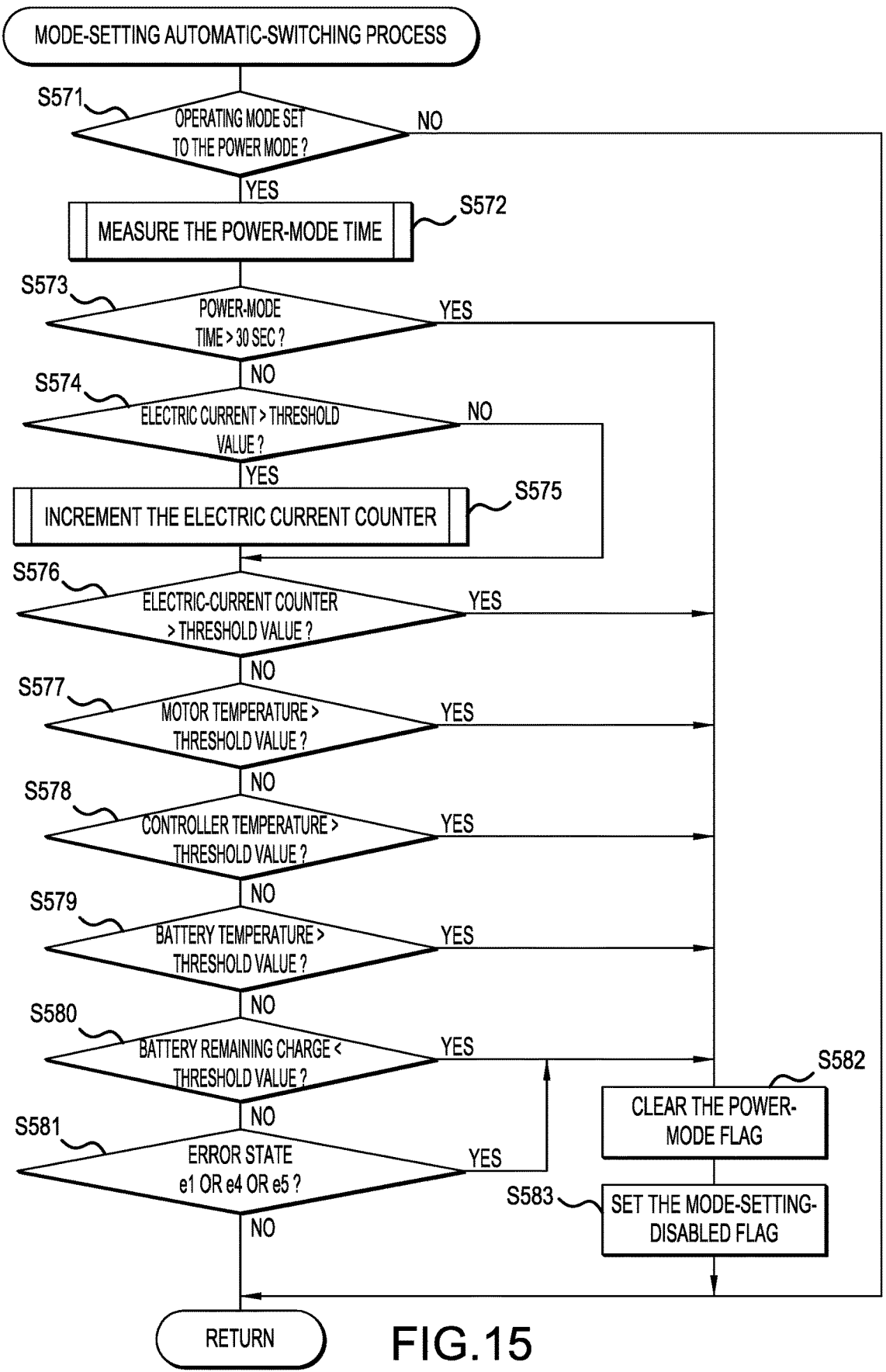
FIG. 15 is a flow chart that shows a mode-setting automatic-switching process.

Next, in the mode-setting automatic-switching process of S570 that is shown in more detail in FIG. 15, it is determined in S571 whether the operating mode is currently set to the power mode by determining whether the power-mode flag is set.

If the operating mode is not currently set to the power mode, then the mode-setting automatic-switching process ends; on the other hand, if the operating mode is currently set to the power mode, then the process proceeds to S572, in which the elapsed time since the power mode was set is measured as a power-mode time.

Next, it is determined in S573 whether the power-mode time exceeds a prescribed enabled time (e.g., 30 sec). If the power-mode time exceeds the enabled time, then the process proceeds to S582. Furthermore, by clearing the power-mode flag in S582, the operating mode of the control circuit 36 returns from the power mode to the normal mode. Then, in S583, the mode-setting-disabled flag is set, after which the mode-setting automatic-switching process ends.

On the other hand, if it is determined in S573 that the power-mode time does not exceed the enabled time, then the process proceeds to S574, in which it is determined whether the load current exceeds a prescribed threshold value. If the load current does exceed the threshold value, the process proceeds to S575, in which an electric-current counter is incremented, in proportion to the magnitude of the load current, using an electric-current additional value that is set to a larger value the larger the load current is, after which the process proceeds to S576. On the other hand, if it is determined in S574 that the load current does not exceed the threshold value, the process also proceeds to S576.

The electric-current counter is the counter for determining, based on the load current, an overloaded driving (overloaded state) of the motor 10. By determining in S576 whether the value of the electric-current counter exceeds a threshold value for determining an overload, it is determined whether the motor 10 is in an overloaded driving state.

If it is determined in S576 that the value of the electric-current counter exceeds the threshold value, then the process proceeds to S582; on the other hand, if it is determined that the value of the electric-current counter is less than the threshold value, then the process proceeds to S577.

In S577, it is determined whether the motor temperature exceeds a threshold value. If the motor temperature exceeds the threshold value, then the process proceeds to S582; on the other hand, if the motor temperature is less than the threshold value, then the process proceeds to S578.

In S578, it is determined whether the controller temperature exceeds a threshold value. If the controller temperature exceeds the threshold value, then the process proceeds to S582; on the other hand, if the controller temperature is less than the threshold value, then the process proceeds to S579.

In S579, it is determined whether the battery temperature exceeds a threshold value. If the battery temperature exceeds the threshold value, then the process proceeds to S582; on the other hand, if the battery temperature is less than the threshold value, then the process proceeds to S580.

In S580, it is determined whether the remaining charge of the battery 9 is less than a threshold value. If the remaining charge of the battery 9 is less than the threshold value, then the process proceeds to S582; on the other hand, if the remaining charge of the battery 9 is the threshold value or more, then the process proceeds to S581.

In S581, it is determined whether the error state is "e1" or "e4" or "e5". That is, it is determined whether a battery error or an abnormal rise in the controller temperature or the motor temperature is currently being detected.

If it is determined in S581 that the error state is "e1," "e4," or "e5," then the process proceeds to S582; on the other hand, if it is determined that the error state is not any one of "e1," "e4," and "e5," then the mode-setting automatic-switching process ends.

Figure 16:
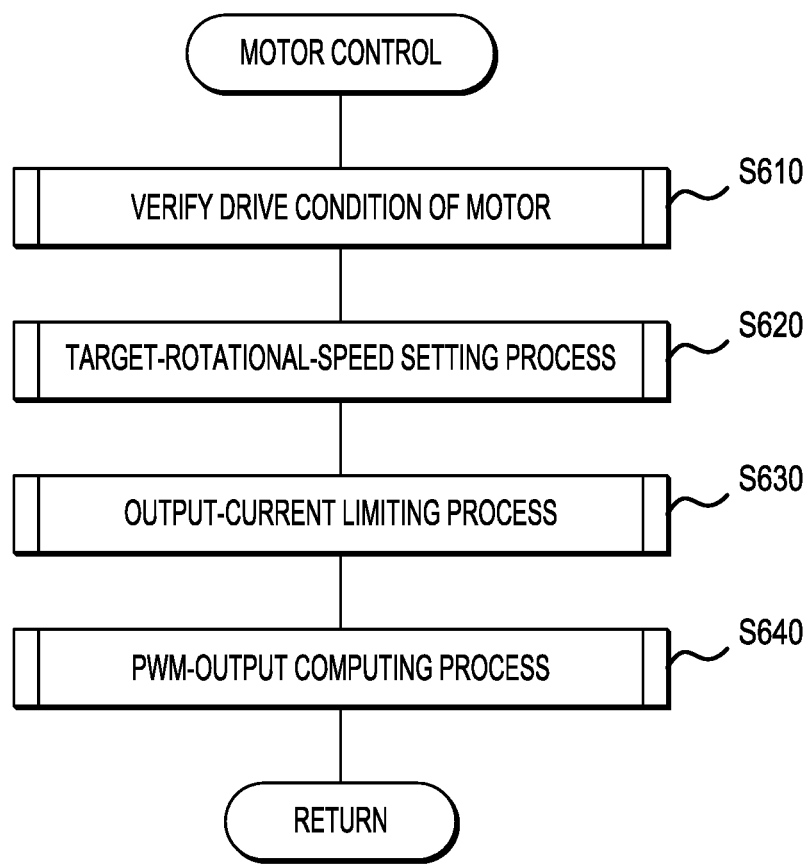
FIG. 16 is a flow chart that shows a motor-control process.

Next, in the motor-control process of S600 that is shown in greater detail in FIG. 16, a drive-condition verifying process for the motor 10 is performed in S610; then, in S620, a target-rotational-speed setting process, in which the target rotational speed of the motor 10 is set to a preset rotational speed, is performed.

In S630, an output-current limiting process is executed. Finally, in S640, a PWM output computing process that sets the duty ratio of a PWM signal, which is the control signal for driving the motor 10 at the target rotational speed, is then executed, after which the motor-control process ends. It is noted that the computation result of the computing process is used to generate the PWM signal, which is output to the gate circuit 34, and the motor 10 is driven and controlled by this PWM signal.

In the drive-condition verifying process of S610, it is sequentially determined (a) whether the main power supply is turned ON, (b) whether the drive SW 18 is in the ON state, and (c) whether the error state is "e0," i.e. in the no-error state.

If the main power supply is turned ON, the drive SW 18 is in the ON state and the error state is "e0," then a motor-drive flag is set, thus enabling the drive of the motor 10. On the other hand, if any of these parameters is in another state, then the motor-drive flag is cleared and driving of the motor 10 is prohibited.

Figure 17:
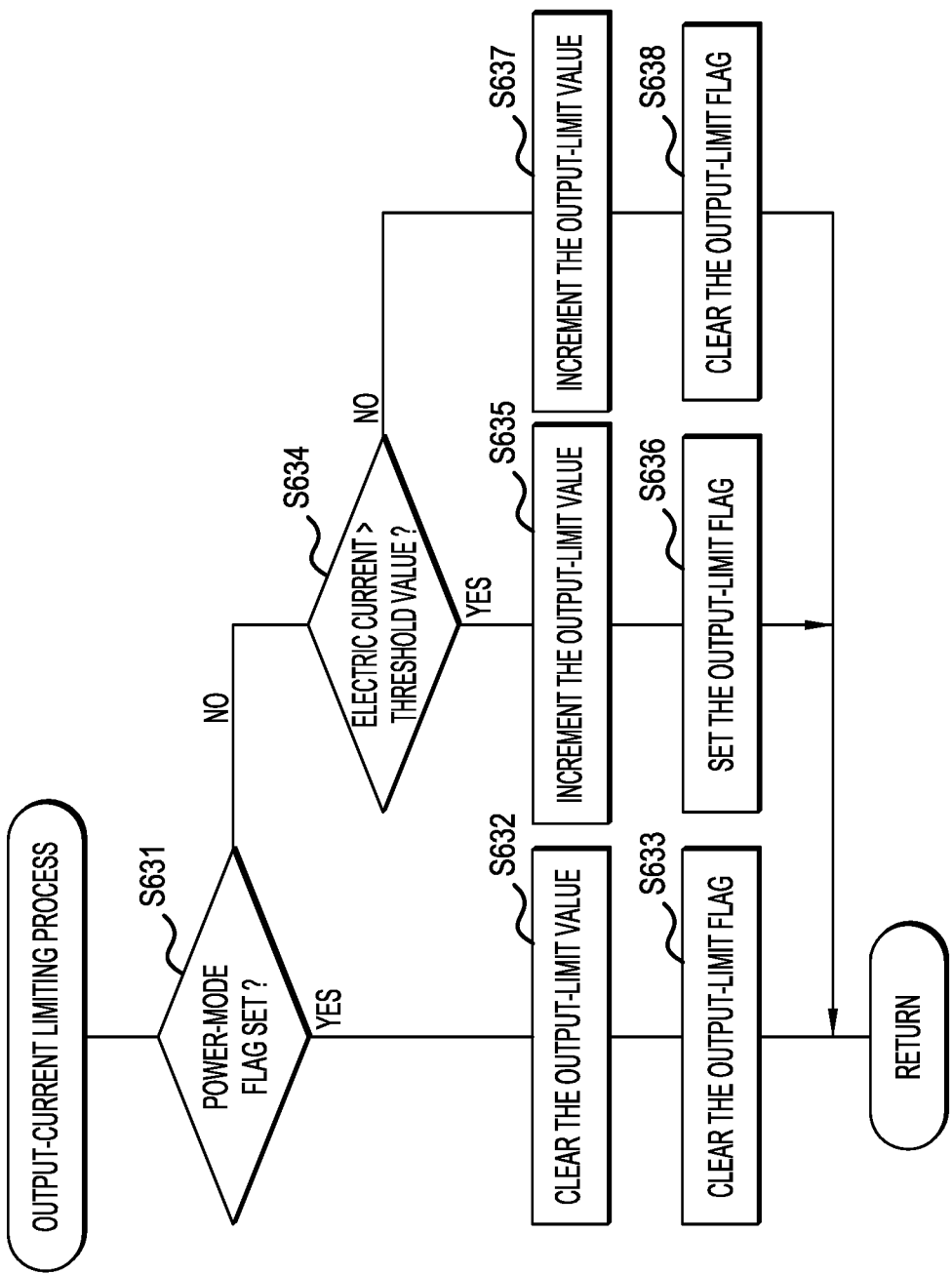
FIG. 17 is a flow chart that shows an output-current limiting process.

In the output-current limiting process of S630 that is shown in more detail in FIG. 17, it is first determined in S631 whether the power-mode flag is set. If the power-mode flag is set, then the process proceeds to S632, in which an output-limit value is cleared; continuing to S633, an output-limit flag is cleared, after which the output-current limiting process ends.

On the other hand, if it is determined in S631 that the power-mode flag is not set, then the process proceeds to S634, in which it is determined whether the load current exceeds a prescribed threshold value. If the load current does exceed the threshold value, then, in S635, a prescribed additional value is added to the output-limit value; continuing to S636, the output-limit flag is set, after which the output-current limiting process ends.

On the other hand, if it is determined in S634 that the load current does not exceed the prescribed threshold value, then a prescribed current value is subtracted from the output-limit value in S637; continuing to S638, the output-limit flag is cleared, after which the output-current limiting process ends.

Figure 18:
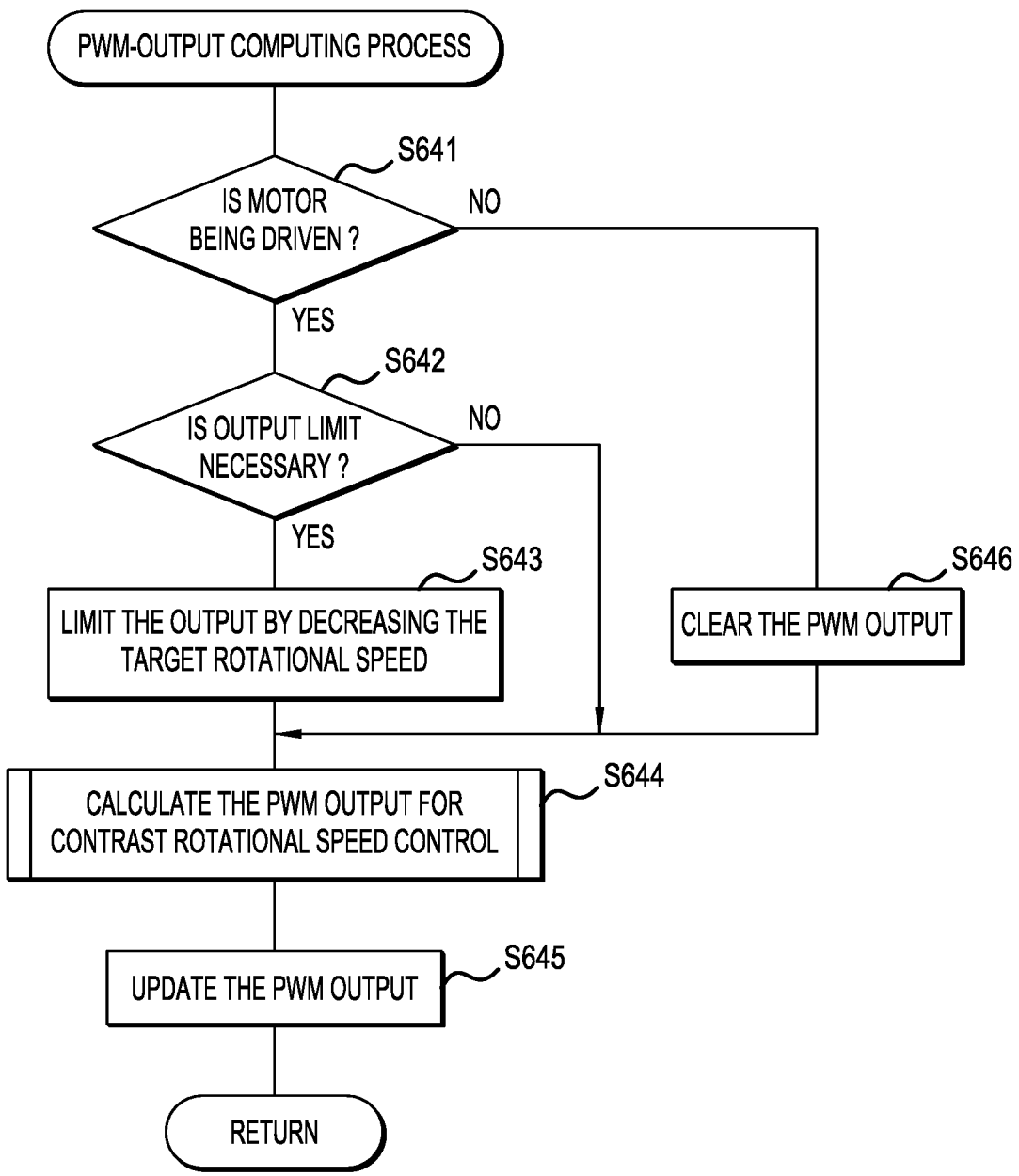
FIG. 18 is a flow chart that shows a PWM-output computing process.

In the PWM-output computing process of S640 that is shown in more detail in FIG. 18, it is first determined in S641 whether the motor 10 is currently being driven; if the motor 10 is not being driven, then the PWM output is cleared in S646 such that the duty ratio becomes 0%, after which the process proceeds to S644.

On the other hand, if it is determined in S641 that the motor 10 is currently being driven, then the process proceeds to S642, in which it is determined whether an output limit is necessary by determining whether the output-limit flag is set.

If the output-limit flag is set and the output limit is necessary, then the output is limited in S643 by decreasing the target rotational speed, after which the process proceeds to S644. On the other hand, if the output-limit flag is cleared and the output limit is unnecessary, then the process proceeds, as is, to S644.

To control (energize) the motor 10 such that it maintains a constant rotational speed, a control value (the duty ratio) of the PWM output is calculated in S644 such that, the difference between the target rotational speed and the actual rotational speed of the motor 10 becomes zero, after which the process proceeds to S645.

Furthermore, in S645, the PWM output is updated to the computation result from S644, after which the PWM-output computing process ends.

Figure 19:
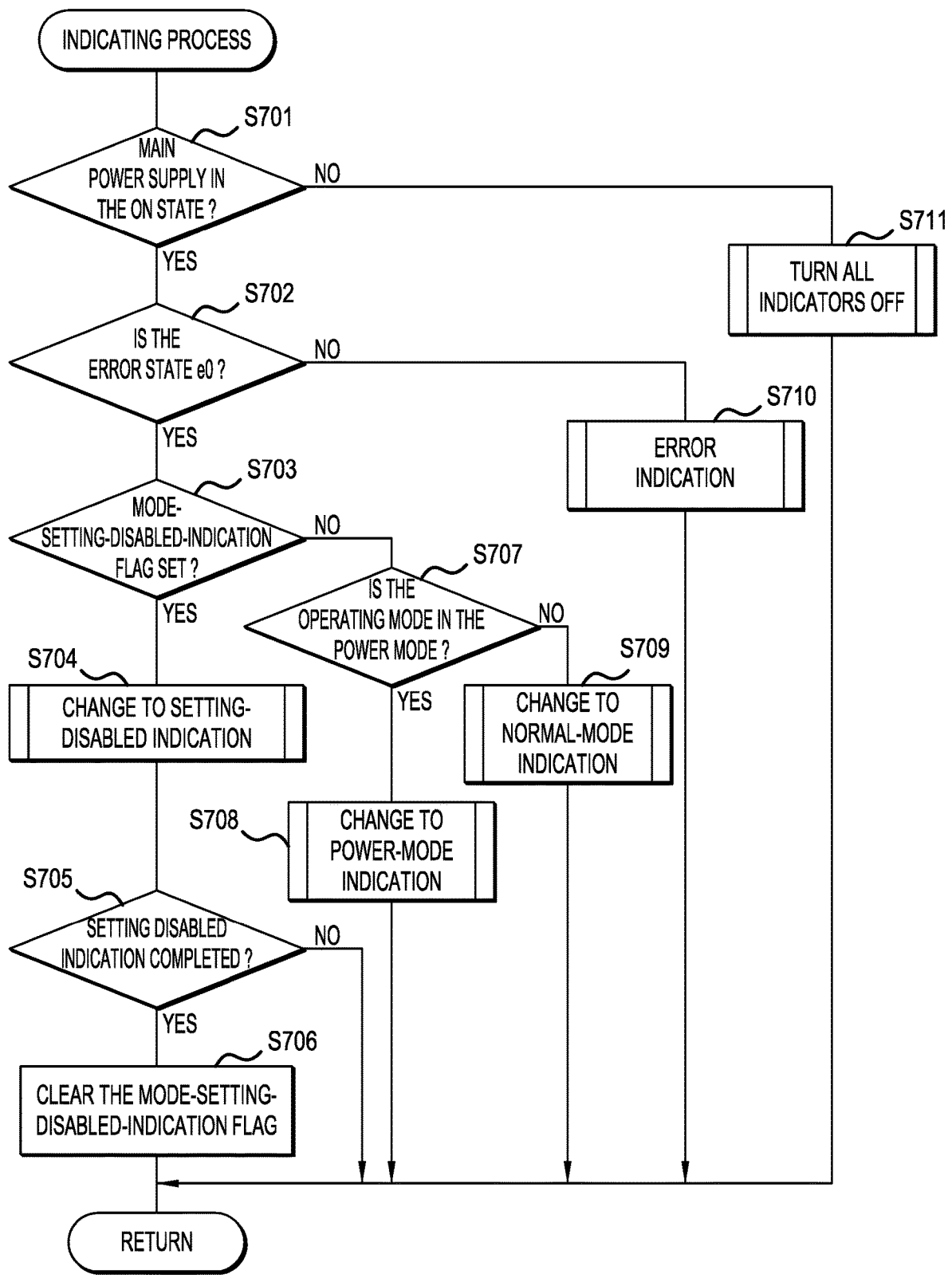
FIG. 19 is a flow chart that shows an indicating process.

In the indicating process of S700 that is shown in more detail in FIG. 19, it is first determined in S701 whether the main power supply is turned ON. If the main power supply is not turned ON, then the process proceeds to S711, in which the indicators of the state-indication part 22 of the operation panel 20 are turned OFF, after which the indicating process ends.

On the other hand, if it is determined in S701 that the main power supply is turned ON, then the process proceeds to S702, in which it is determined whether the error state is "e0." If the error state is not "e0" (i.e. because some abnormality is being detected), the process then proceeds to S710, in which an error indication is performed by turning ON or flashing the state-indication part 22 in red, after which the indicating process ends.

On the other hand, if it is determined in S702 that the error state is "e0" (i.e., no errors), then the process proceeds to S703, in which, by determining whether the mode-setting-disabled-indication flag is set, it is determined whether to indicate that setting of the power mode has changed to disabled.

If it is determined in S703 that power-mode setting disabled is to be indicated, then the process proceeds to S704, in which, for example, power-mode setting disabled is indicated by flashing the state-indication part 22 a prescribed count (e.g., three times) in yellow, after which the process proceeds to S705.

In S705, it is determined whether the indication of power-mode setting disabled has completed. If the indication of setting disabled has completed, then the process proceeds to S706, in which the mode-setting-disabled-indication flag is cleared, after which the indicating process ends. On the other hand, if it is determined in S705 that the indication of setting disabled has not completed, then the indicating process ends as is.

On the other hand, if it is determined in S703 that the mode-setting-disabled-indication flag is cleared and power-mode setting disabled is not to be indicated, then the process proceeds to S707, in which it is determined whether the operating mode is currently in the power mode.

If the operating mode is currently in the power mode, then the process proceeds to S708, in which, for example, it is indicated that the operating mode is currently in the power mode by turning ON the state-indication part 22 in yellow, after which the indicating process ends.

On the other hand, if it is determined in S707 that the operating mode is currently not in the power mode, then the process proceeds to S709, in which, for example, it is indicated that the operating mode is currently in the normal mode by turning ON the state-indication part 22 in green, after which the indicating process ends.

Therefore, the user can distinguish, based on the lamp ON state of the state-indication part 22, whether the chain saw 2 is operating in the power mode or the normal mode and furthermore can also perceive (i) an error state, (ii) whether use of the power mode is prohibited in order to protect the product, etc.

Figure 20:
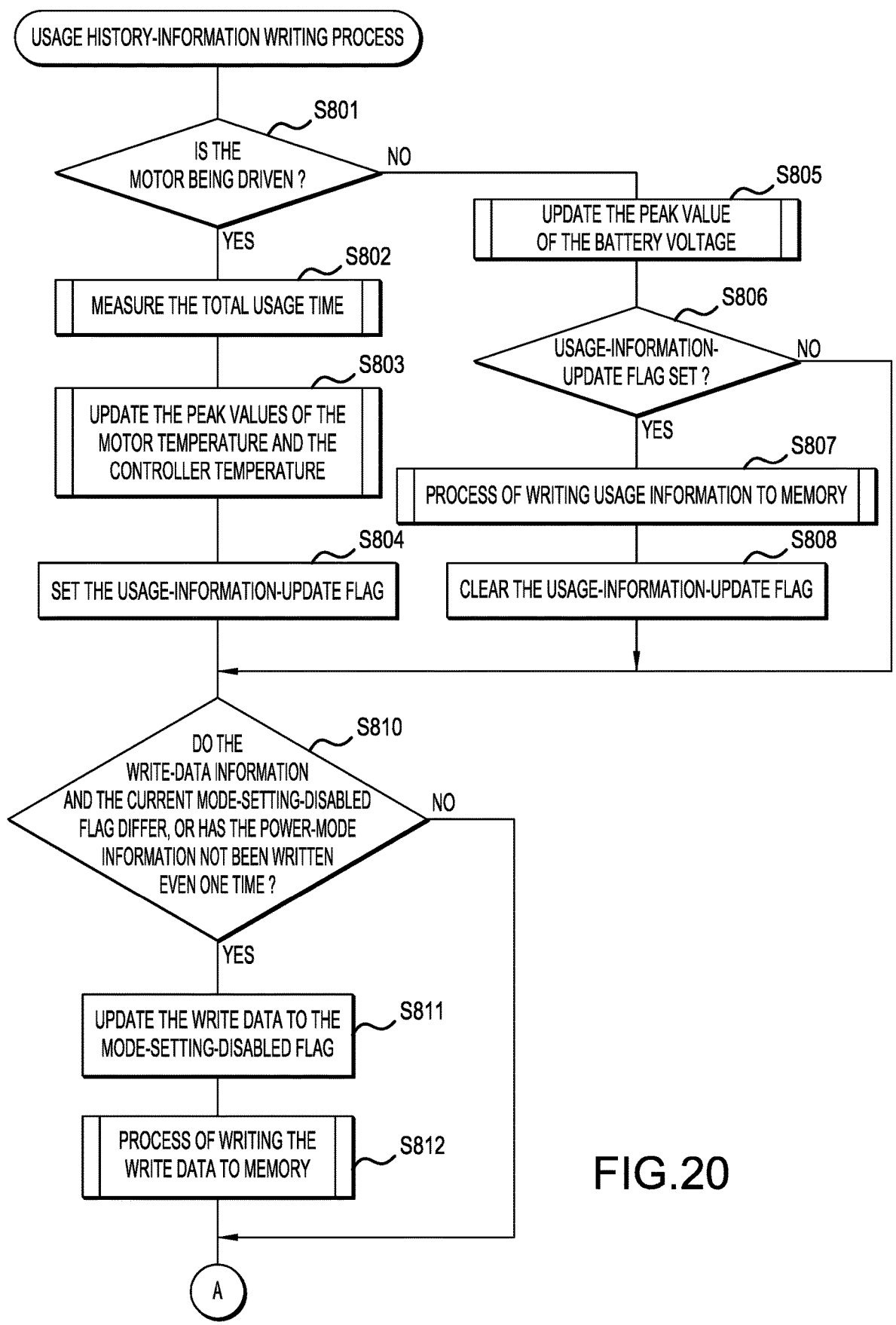
FIG. 20 is a flow chart that shows a first-half portion of a history-information writing process.
Figure 21:
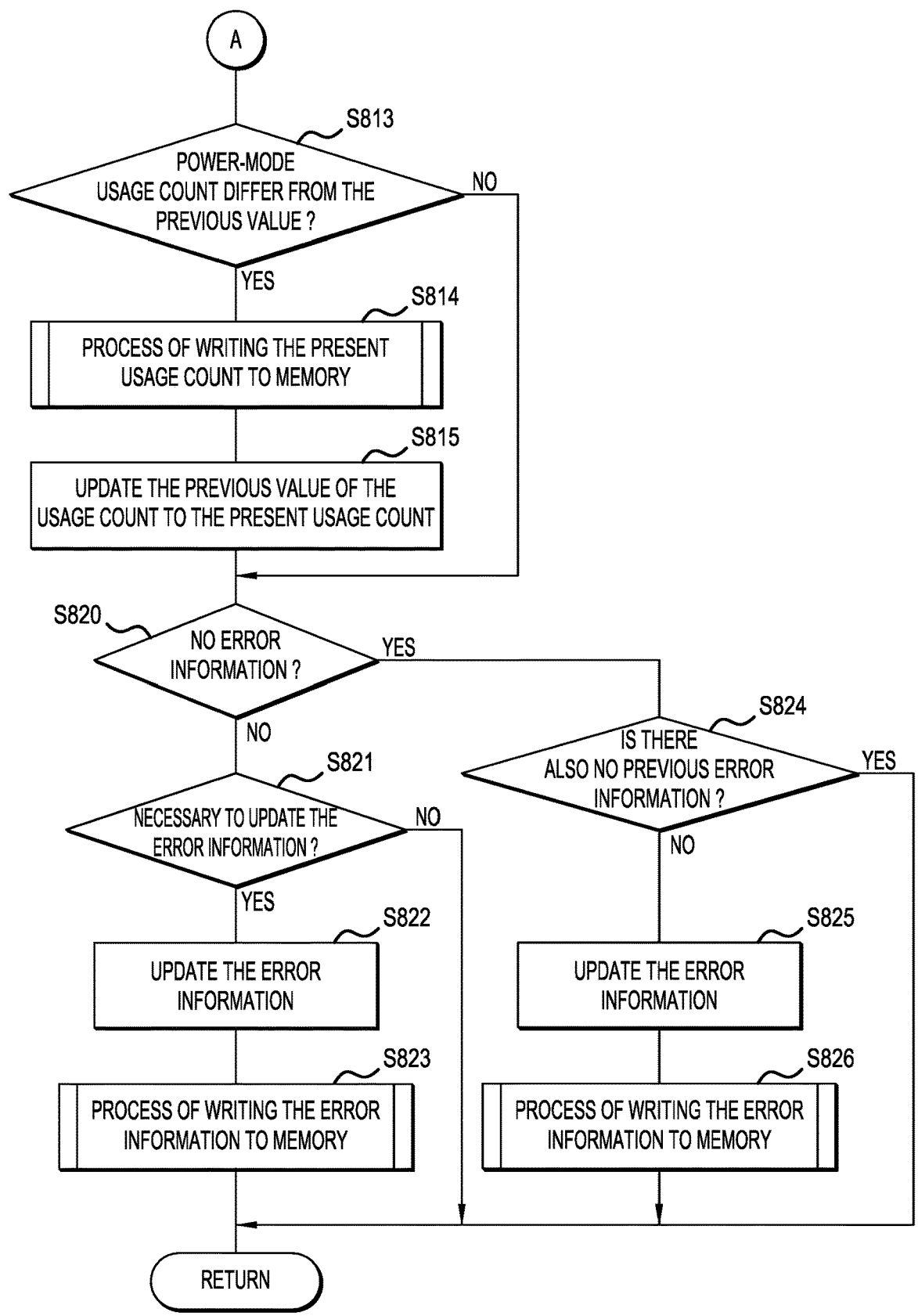
FIG. 21 is a flow chart that shows a second-half portion of the history-information writing process of FIG. 20.

Next, the usage history-information writing process of S800 (FIG. 3) will be explained in further detail with reference FIG. 20 and FIG. 21, wherein it is first determined in S801 whether the motor 10 is currently being driven. If the motor 10 is being driven, then the total usage time of the chain saw 2 is measured (updated) in S802. Then, continuing to S803, the peak values of the motor temperature and the controller temperature are updated; continuing to S804, a usage-information-update flag is set, after which the process proceeds to S810.

On the other hand, if it is determined in S801 that the motor 10 is currently not being driven, then the process proceeds to S805, in which the battery voltage is detected and the peak value thereof is updated. Then, continuing to S806, it is determined whether the usage-information-update flag is set. If the usage-information-update flag is set, then the process proceeds to S807; on the other hand, if the usage-information-update flag is not set, then the process proceeds to S810.

In S807, the total usage time, the peak values of the motor temperature and the controller temperature, and the peak value of the battery voltage, which were updated in S802, S803, and S805, are written into the memory 38 as usage information (usage history) of the chain saw 2. Then, continuing to S808, the usage-information-update flag is cleared, after which the process proceeds to S810.

In S810, it is determined whether the power-mode-information write data and the current mode-setting-disabled flag differ or whether the power-mode information has not been written even one time.

If it is determined in S810 that the power-mode-information write data and the current mode-setting-disabled flag differ or if it is determined that the power-mode information has not been written even one time, then the process proceeds to S811; otherwise, the process proceeds to S813.

In S811, the power-mode-information write data is updated to the current mode-setting-disabled flag. Then continuing to S812, the power-mode-information write data is written into the memory 38, after which the process proceeds to S813.

Next, in S813 (FIG. 21), it is determined whether the power-mode usage count differs from its previous value. If the power-mode usage count differs from its previous value, then the process proceeds to S814; on the other hand, if the power-mode usage count is the same as its previous value, then the process proceeds to S820.

In S814, the present usage count is written into the memory 38. Then, in S815, the previous value of the usage count is modified to the present usage count, thereby ensuring that the present usage count is rewritten into the memory 38 in subsequent processing, after which the process proceeds to S820.

Next, in S820, it is determined whether no error information is presently detected by determining whether the error state is "e0." Furthermore, if there is error information, then the process proceeds to S821, in which it is determined whether that error information differs from the error information written in the memory 38 and therefore it is necessary to update the error information in the memory 38.

If it is necessary to update the error information (S821: Yes), then the process proceeds to S822, in which the error information for writing is updated; and in S823, that updated error information is written into the memory 38, after which the history-information writing process ends. On the other hand, if it is determined in S821 that the updating of the error information is not necessary (S821: No), then the usage history-information writing process ends.

However, if it is determined in S820 that there is no error information, then the process proceeds to S824, in which it is determined whether there is also no previous error information in the memory 38. If previous error information is written in the memory 38 (S824: No), then the process proceeds to S825, in which the error information for writing is updated; in S826, that updated error information is written into the memory 38, after which the history-information writing process ends. On the other hand, if it is determined in S824 that there is no previous error information (S824: Yes), then there is no need to write error information into the memory 38, and therefore the usage history-information writing process ends.

As explained above, in the chain saw 2 of the present embodiment, when the main power-supply SW 21 is operated and the main power supply is switched from OFF to ON, if the main power-supply SW 21 is pressed for a long time (e.g., for a prescribed time (e.g., 2 sec) or longer), then the control circuit 36 determines that the power mode has been selected.

Thereafter, based on the temperature, the usage time, the operation history, and the like of the battery 9, the motor 10, and the motor-drive unit 30, the control circuit 36 determines whether the battery 9 and motor 10 are in a state (condition) in which the motor-drive unit 30 can be driven (operated) in the power mode, in which the load current is larger than in the normal mode, without leading to deterioration of those parts.

Figure 22:
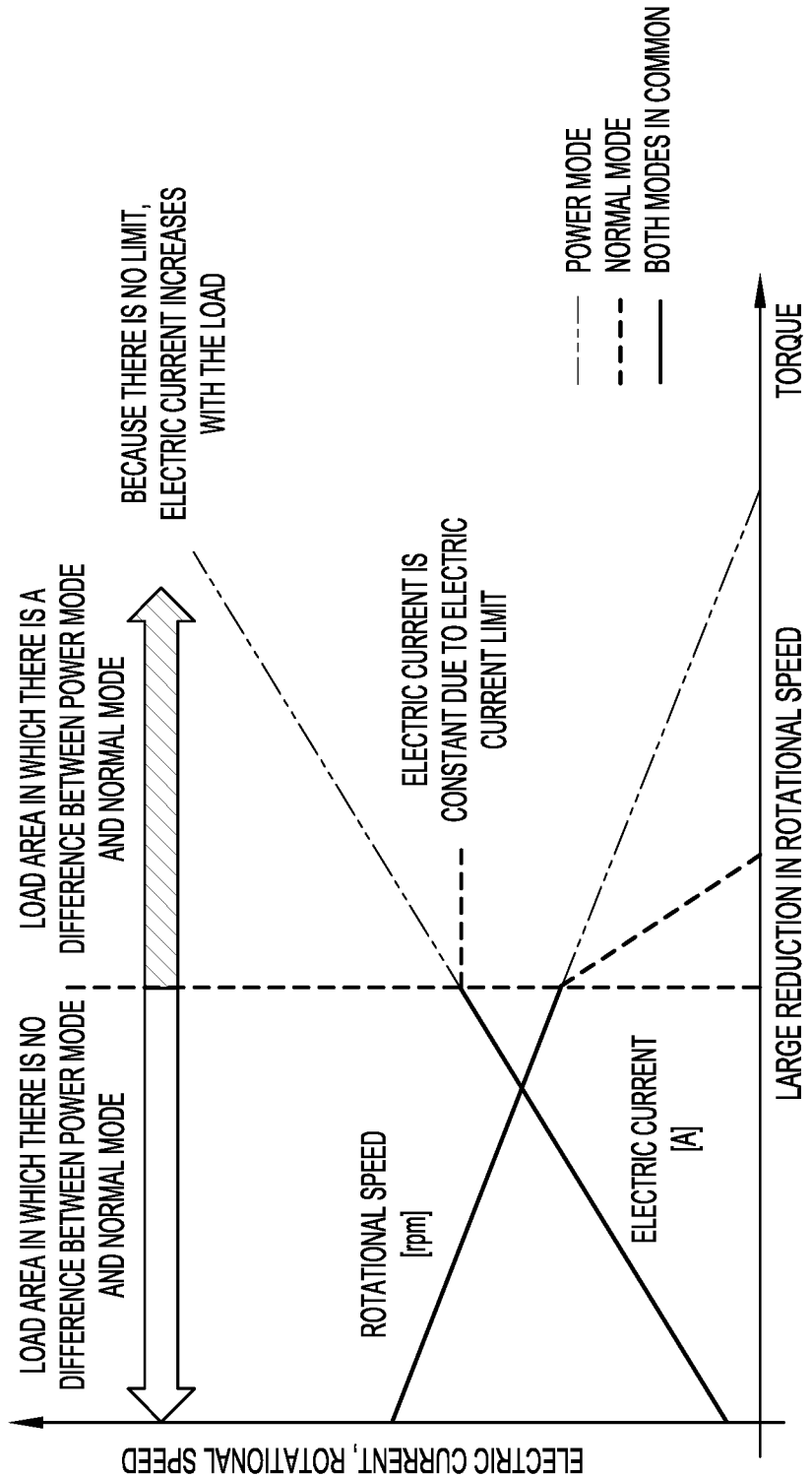
FIG. 22 is a line drawing that shows the characteristics of a motor in which differences arise between a normal mode and the power mode.

That is, if each of the above-mentioned parts is in a state (condition) in which they can be operated normally (safely) in the power mode, then, as shown in FIG. 22, the load current is not bounded by an upper limit by setting an output-limit value as in the normal mode. Instead, the electric-current restriction based on the output-limit value is removed, and thereby the energy during drive of the motor 10 is increased.

As a result, the output torque of the motor 10 is increased in the power mode, as compared to the normal mode, thereby increasing the cutting performance of the chain saw 2 when cutting wood, etc.

In the power mode, the continuous-operation time of the power mode is restricted to a prescribed time (in the present embodiment, 30 sec), and the usage count of the power mode is also restricted to N times per same battery. Consequently, it is possible to reduce the likelihood of deterioration of the chain saw 2, the battery 9, and the like caused by operation in the power mode for an excessively long time or caused by repeated operation in the power mode using the same battery.

Consequently, according to the chain saw 2 of the present embodiment, high load work that could not be performed by known chain saws can be performed without increasing the size of the drive system of the motor 10, including the battery pack 8, thereby improving the user-friendliness of the chain saw 2.

MODIFIED EXAMPLES

In the embodiments above, it was described that, when setting the operating mode of the control circuit 36 to the power mode, the main power-supply SW 21 is pressed for a long time at startup. This design feature ensures that the operating mode cannot easily transition to the power mode by a switch operation of the user during operation of the chain saw 2.

That is, in the above embodiments, once the main power-supply SW 21 is operated and the main power supply is set to the OFF state, it is made difficult thereafter to transition to the power mode by making it such that the power mode can be set by a long press of the main power-supply SW 21. Consequently, usage of the power mode is restricted.

Figure 23A:
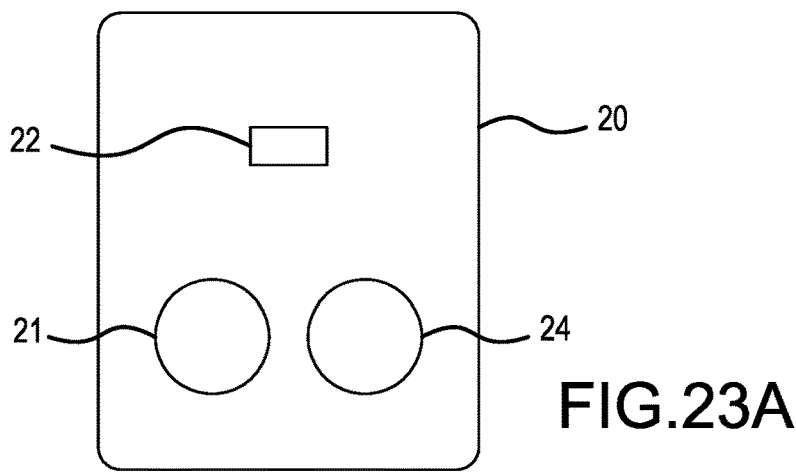
FIGS. 23A-C respectively depict explanatory diagrams that show modified examples 1, 2, 3 of an operation panel.
Figure 23B:
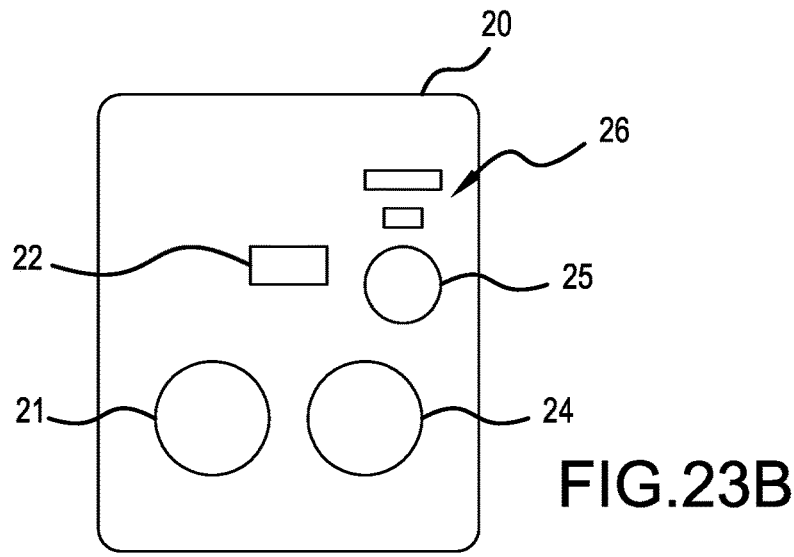

However, as shown in FIG. 23A and FIG. 23B, a power-mode-setting switch 24 (hereinbelow, abbreviated as the "power-mode-setting SW") for setting the power mode can be provided on the operation panel 20. In such an alternate embodiment of the present disclosure, the power mode can be set by operation (manipulation) of the power-mode-setting SW 24.

It is noted that the operation panel 20 shown in FIG. 23A differs from the operation panel 20 of the above embodiments only with regard to the power-mode-setting SW 24.

The operation panel 20 shown in FIG. 23B further includes, in addition to the power-mode-setting SW 24, a speed-switching switch 25 (hereinbelow, abbreviated as the "speed-switching SW"), which switches the rotational speed of the motor 10 in the normal mode to a high speed or a low speed, and a speed-indication part 26, which indicates the set speed (high speed or low speed).

Figure 23C:
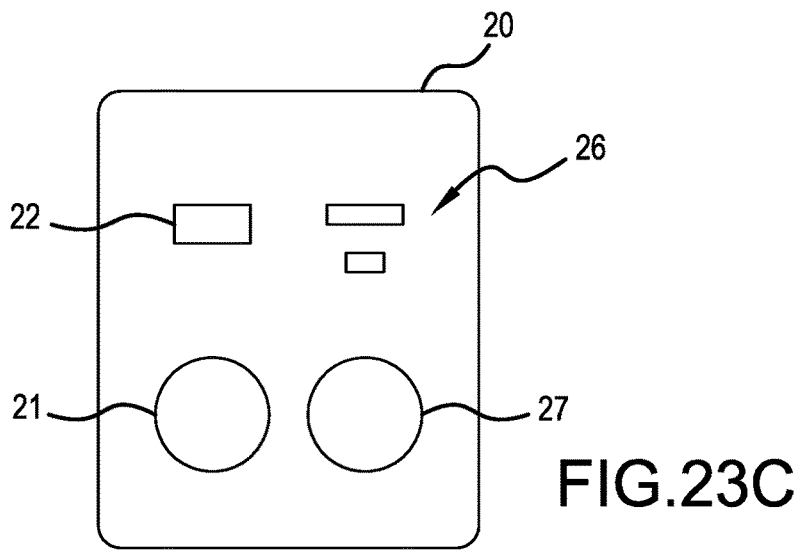

In the operation panel 20 shown in FIG. 23C, the speed-switching SW 25 shown in FIG. 23B may be omitted from the operation panel 20. Furthermore, instead of the power-mode-setting SW 24, a mode-changing switch 27 (hereinbelow, abbreviated as the "mode-changing SW") having the functions of both switches may be provided.

If the operation panel 20 is configured as shown in FIG. 23A or FIG. 23C, then, in S220 shown in FIG. 5, input signals should be acquired from the drive SW 18 and the main power-supply SW 21, as well as from the power-mode-setting SW 24 (FIG. 23A) or the mode-changing SW 27 (FIG. 23C).

However, if the operation panel 20 is configured as shown in FIG. 23B, then, in S220 shown in FIG. 5, input signals should be acquired from the drive SW 18, the main power-supply SW 21, the power-mode-setting SW 24, and the speed-switching SW 25.

Figure 24:
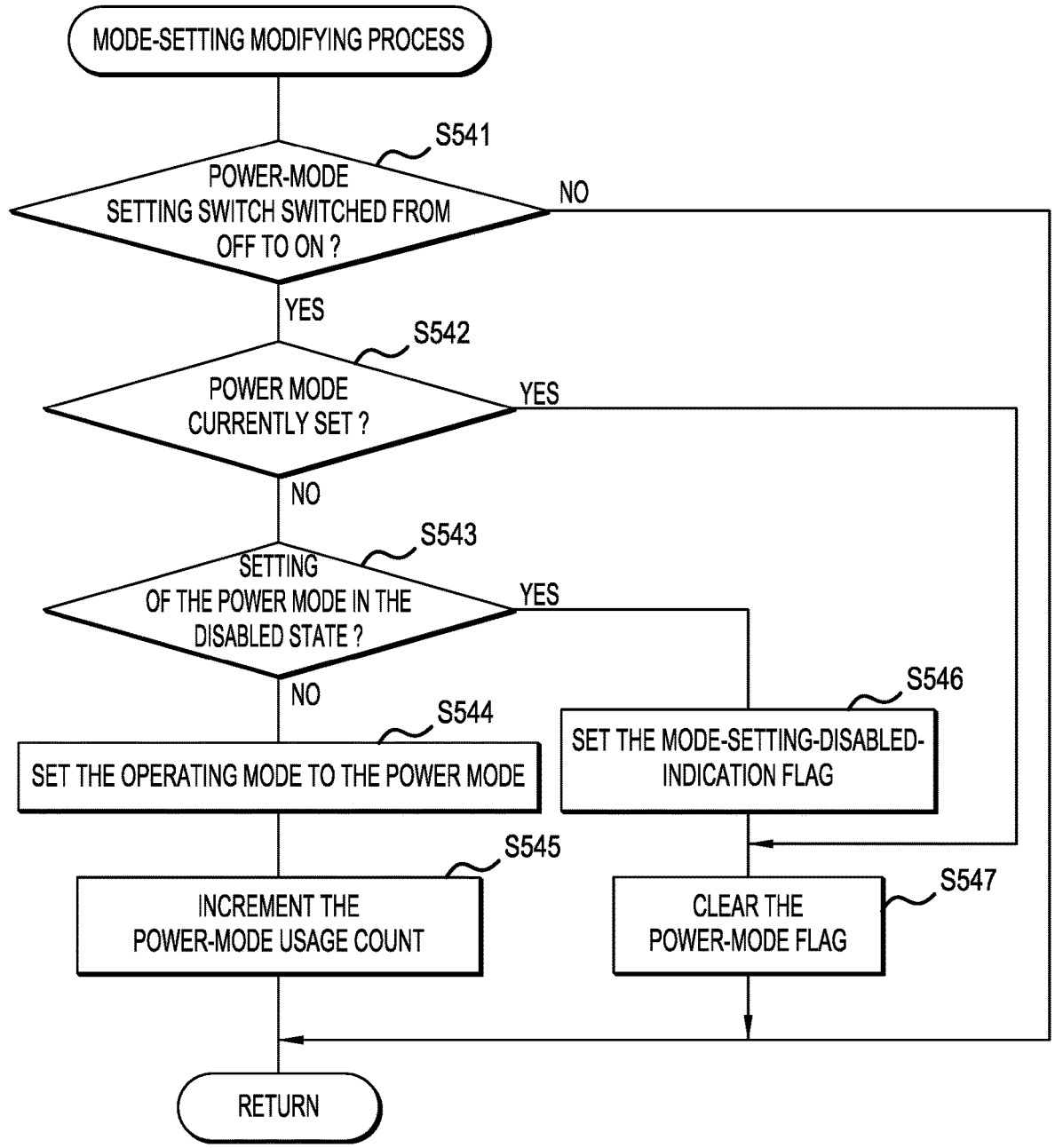
FIG. 24 is a flow chart that shows a mode-setting modifying process according to modified example 1.

In addition, if the power mode is settable using the power-mode-setting SW 24 by configuring the operation panel 20 as shown in FIG. 23A or FIG. 23B, then the mode-setting modifying process performed in S530 (FIG. 8) may be implemented by the procedure shown in FIG. 24.

That is, in the mode-setting modifying process shown in FIG. 24, it is first determined in S541 whether the power-mode-setting SW 24 has been switched from OFF to ON. If the power-mode-setting SW 24 has not been switched from OFF to ON, then the mode-setting modifying process ends.

On the other hand, if the power-mode-setting SW 24 has been switched from OFF to ON, then the process proceeds to S542, in which it is determined whether the power mode is currently set based on whether the power-mode flag is set.

If the power mode is set (S542: Yes), then the process proceeds to S547, in which the power-mode flag is cleared, after which the mode-setting modifying process ends. On the other hand, if the power mode is not set (S542: No), then the process proceeds to S543, in which it is determined whether the setting of the power mode is in the disabled state by determining whether the mode-setting-disabled flag is set. If setting of the power mode is in the disabled state (S543: Yes), then, to inform such, the mode-setting-disabled-indication flag is set in S546, after which the process proceeds to S547.

On the other hand, if setting of the power mode is not in the disabled state (S543: No), then the process proceeds to S544, in which the operating mode is set to the power mode by setting the power-mode flag, after which the process proceeds to S545.

Furthermore, by then adding the value 1 to the usage count of the power mode in S545, the usage count of the power mode is updated, after which the mode-setting modifying process ends.

By executing the mode-setting modifying process in this manner, it becomes possible to switch the operating mode of the control circuit 36 temporarily to the power mode using the power-mode-setting SW 24.

Figure 25:
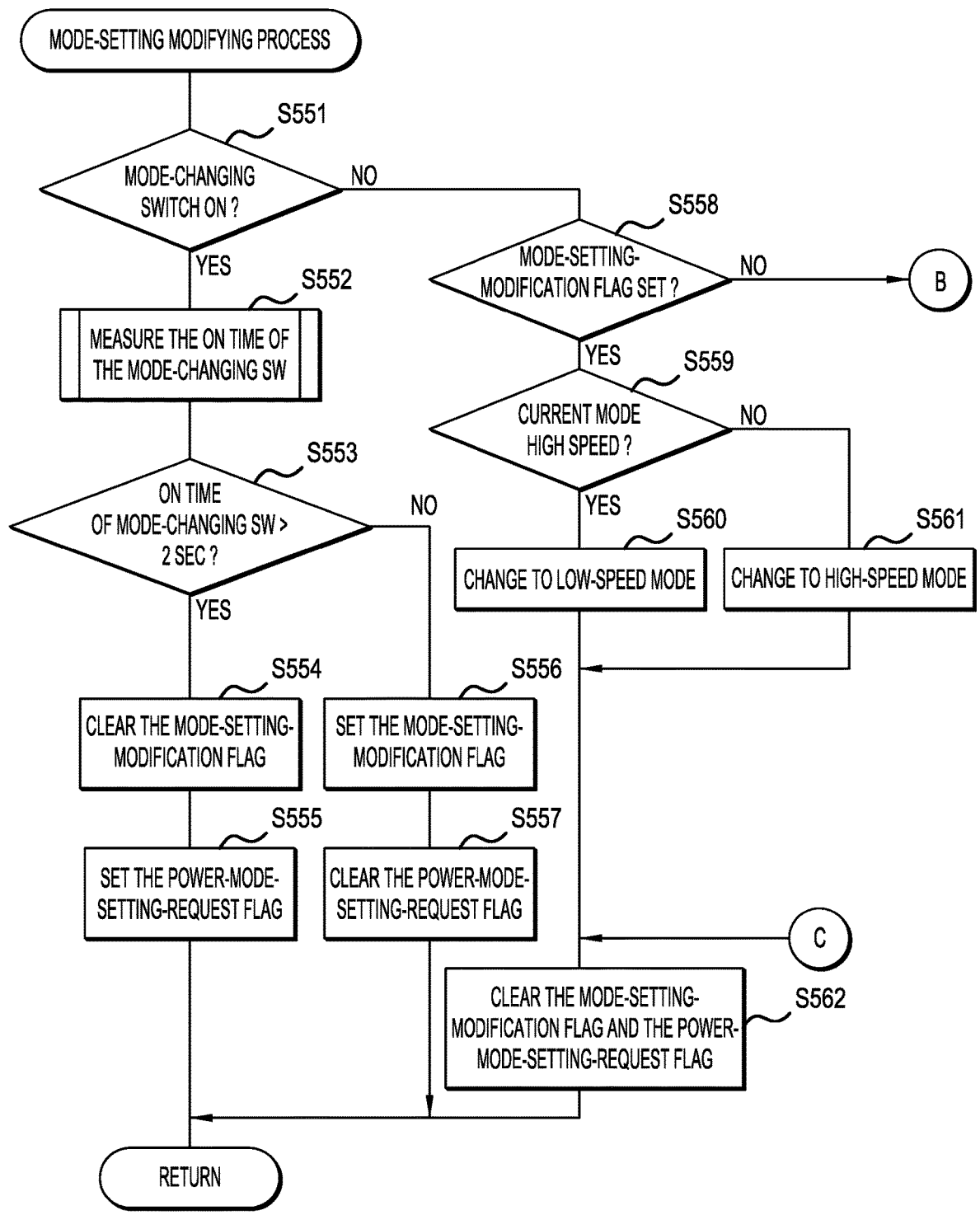
FIG. 25 is a flow chart that shows a first part of a mode-setting modifying process according to modified example 2.
Figure 26:
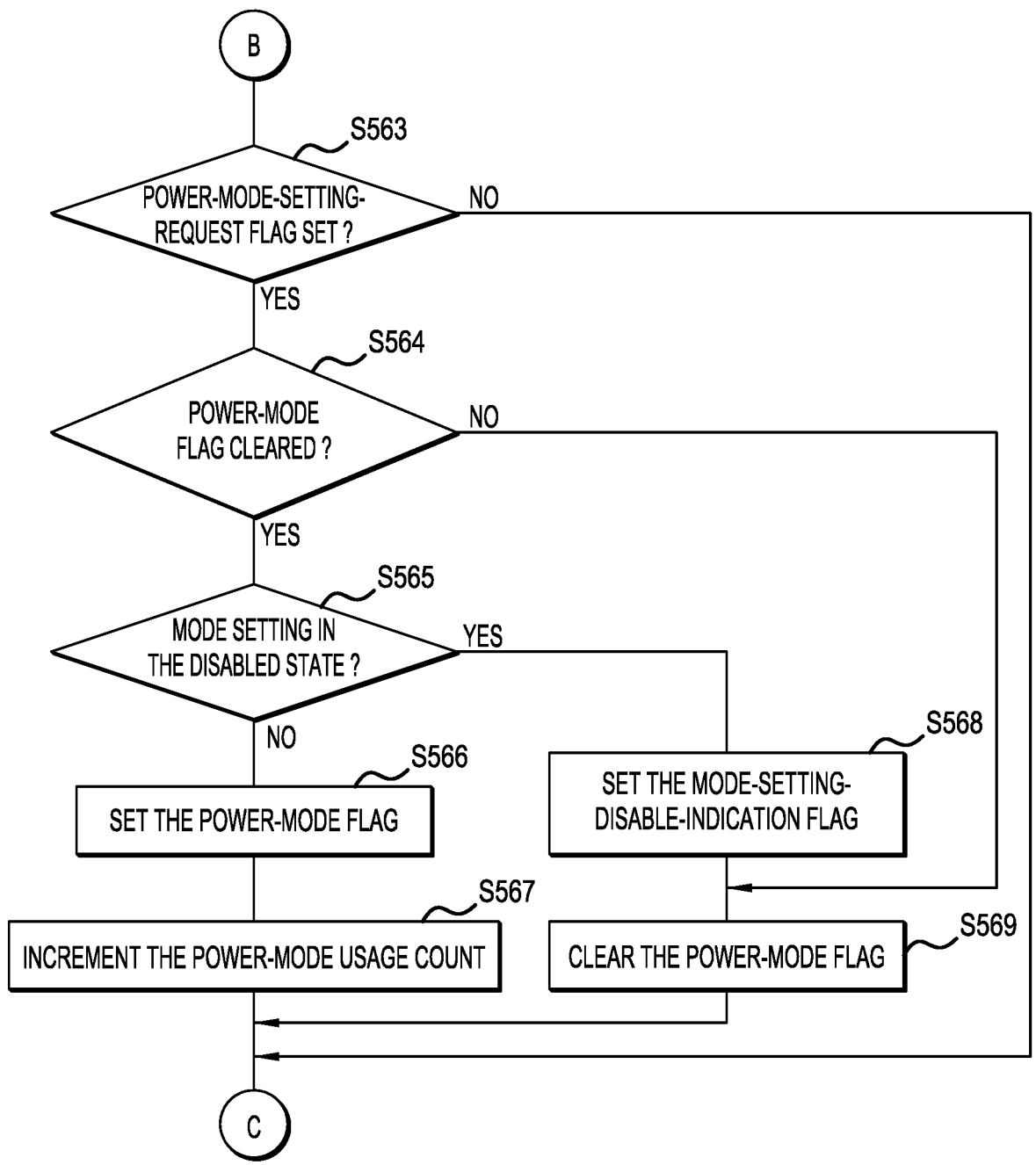
FIG. 26 is a flow chart that shows a second part of the mode-setting modifying process according to modified example 2.

On the other hand, if the operation panel 20 has been configured as shown in FIG. 23C so that the power mode the speed in the normal mode can be set using the mode-changing SW 27, then the mode-setting modifying process may be implemented by the procedure shown in FIG. 25 and FIG. 26.

That is, in the mode-setting modifying process shown in FIG. 25 and FIG. 26, it is first determined in S551 whether the mode-changing SW 27 is in the ON state. If the mode-changing SW 27 is in the ON state, then the process proceeds to S552, in which the ON time of the mode-changing SW 27 is measured.

Then, continuing to S553, it is determined whether the ON time of the mode-changing SW 27 exceeds a prescribed determination time (e.g., 2 sec). If the ON time of the mode-changing SW 27 exceeds the determination time, then the process proceeds to S554; on the other hand, if the ON time of the mode-changing SW 27 is the determination time or less, then the process proceeds to S556.

In S554, a mode-setting-modification flag is cleared; then, continuing to S555, a power-mode-setting-request flag is set, after which the mode-setting modifying process ends. On the other hand, in S556, the mode-setting-modification flag is set; then, continuing to S557, the power-mode-setting-request flag is cleared, after which the mode-setting modifying process ends.

However, if it is determined in S551 that the mode-changing SW 27 is not in the ON state (S551: No), then the process proceeds to S558, in which it is determined whether the mode-setting-modification flag is set. If the mode-setting-modification flag is set (S558: Yes), then the process proceeds to S559, in which it is determined whether the current operating mode (normal mode) is in the high-speed mode; then, if the current operating mode is in the high-speed mode (S559: Yes), then the operating mode is changed to the low-speed mode in S560, after which the process proceeds to S562.

On the other hand, if it is determined in S559 that the current operating mode is not in the high-speed mode (S559: No), then the process proceeds to S561, in which the operating mode is changed to the high-speed mode, after which the process proceeds to S562.

Finally, in S562, the mode-setting-modification flag and the power-mode-setting-request flag are cleared, after which the mode-setting modifying process ends.

In addition, if it is determined in S558 that the mode-setting-modification flag is cleared (S558: No), then the process proceeds to S563 (FIG. 26), in which it is determined whether the power-mode-setting-request flag is set.

If the power-mode-setting-request flag is not set (S563: No), then the mode-setting modifying process ends; on the other hand, if the power-mode-setting-request flag is set (S563: Yes), then the process proceeds to S564, in which it is determined whether the power-mode flag is cleared.

If the power-mode flag is not cleared, that is, if the power mode is currently not set (S564: No), then the process proceeds to S569, in which the power-mode flag is cleared, after which the mode-setting modifying process ends.

On the other hand, if the power-mode flag is cleared (S564: Yes), then the process proceeds to S565, in which it is determined whether setting of the power mode is in the disabled state by determining whether the mode-setting-disabled flag is set.

If setting of the power mode is in the disabled state (S565: Yes), then, to inform such, the mode-setting-disabled-indication flag is set in S568, after which the process proceeds to S569. On the other hand, if setting of the power mode is not in the disabled state (S565: No), then the process proceeds to S566, in which the operating mode is set to the power mode by setting the power-mode flag, after which the process proceeds to S567.

Furthermore, by then adding the value 1 to the usage count of the power mode, the usage count of the power mode is updated in S567, after which the mode-setting modifying process ends.

By executing the mode-setting modifying process in this manner, it becomes possible to sequentially switch the operating mode of the control circuit 36 by operating (manipulating) the mode-changing SW 27, to any one of the power mode, the high-speed mode, and the low-speed mode.

Next, if the operation panel 20 is configured as shown in FIG. 23B or FIG. 23C and it is made possible to switch the speed setting of the motor 10 in the normal mode to high speed or low speed, then the target rotational speed setting process of S620 (FIG. 16) may be implemented using the following procedure.

That is, in the target rotational speed setting process, it is determined whether the current operating mode is in the high-speed mode or the low-speed mode. If it is in the high-speed mode, then the target rotational speed is set to a preset high-speed rotational speed; on the other hand, if it is in the low-speed mode, then the target rotational speed is set to a preset low-speed rotational speed.

In this way, it becomes possible to switch the target rotational speed in the low-speed mode and the high-speed mode to "low speed" or "high speed," respectively, and thereby drive the motor 10 in the low-speed mode or the high-speed mode.

In addition, if the rotational speed of the motor 10 in the normal mode can thus be set to "high speed" or "low speed," then it is necessary to indicate the set speed on the speed-indication part 26 of the operation panel 20. Then, in order to do that, the indicating process of S700 (FIG. 3) may be implemented using the procedure shown in FIG. 27.

Figure 27:
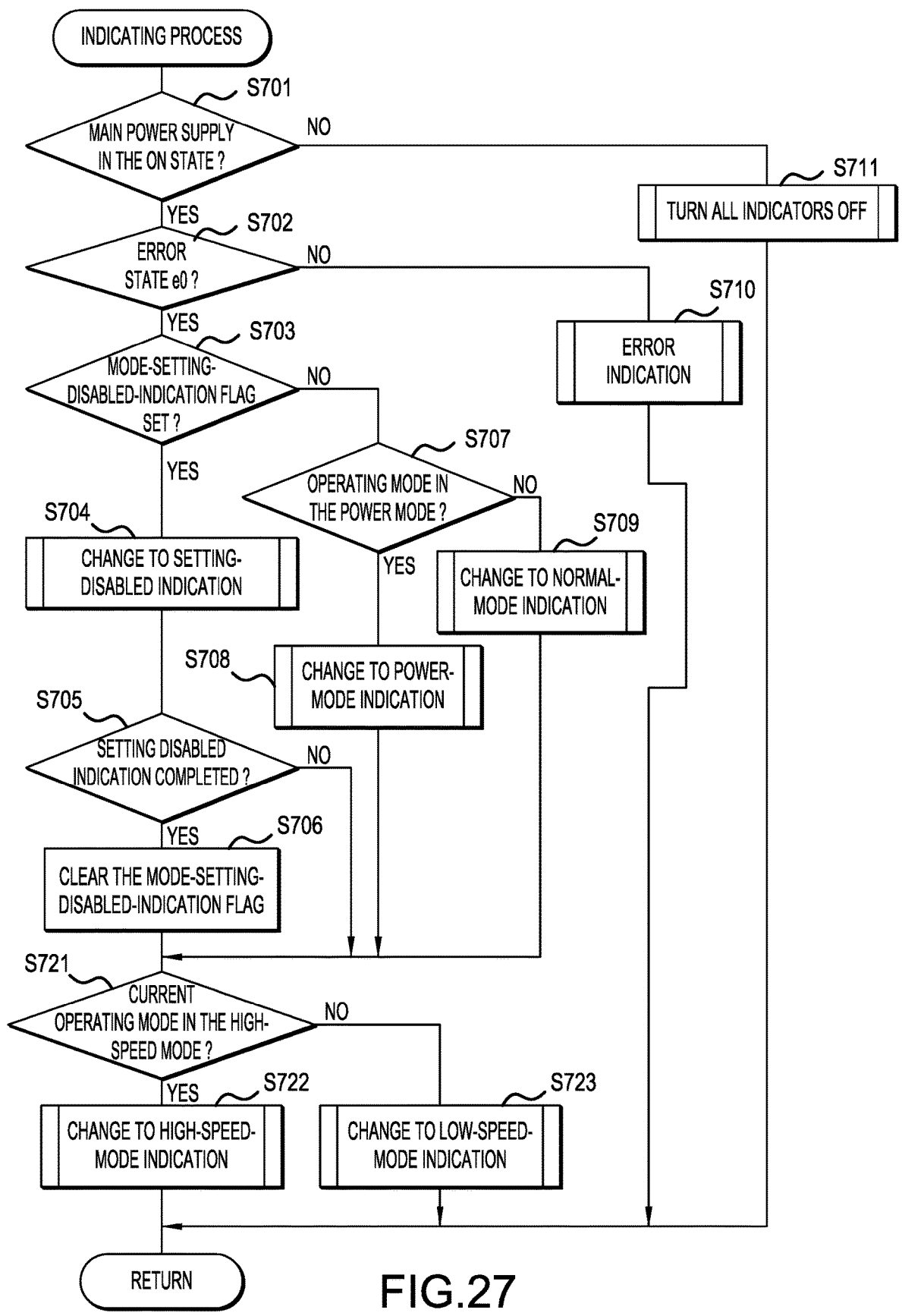
FIG. 27 is a flow chart that shows a modified example of the indicating process.

That is, the indicating process shown in FIG. 27 is implemented by a procedure that is substantially the same as that of the indicating process of the above embodiment shown in FIG. 19, and the points that differ from the indicating process of the above embodiment are the addition of the processing in S721-S723.

That is, in the indicating process of the present modified example, if the result of S705 is NO, or if the processing of S706, S708, S709 is executed, then the indicating process proceeds to S721, in which it is determined whether the current operating mode (normal mode) is in the high-speed mode.

If the current operating mode is in the high-speed mode (S721: Yes), then the process proceeds to S722, in which the indication of the speed-indication part 26 is changed to the high-speed-mode indication, after which the indicating process ends. On the other hand, if the current operating mode is in the low-speed mode (S721: No), then the process proceeds to S723, in which the indication of the speed-indication part 26 is changed to the low-speed-mode indication, after which the indicating process ends.

It is noted that the indication of the speed on the speed-indication part 26 may be implemented, for example, in the high-speed mode, by turning ON both indication parts provided at two locations of the speed-indication part 26, and, in the low-speed mode, by turning ON one of the indication parts provided at two locations on the speed-indication part 26.

It is noted that a plurality of indication parts of the state-indication part 22 and the speed-indication part 26 are provided on the operation panel 20 shown in FIG. 23B and FIG. 23C. Consequently, when indicating the error state, the error details may be distinguishably indicated by changing the indication states (e.g., the indication color and/or the lamp ON/FLASHING state) of the plurality of indication parts.

In the above-described embodiments, when the electric work machine is in the power mode, the output-limit value set in the normal mode is eliminated and an electric current greater than that in the normal mode can be supplied when the motor 10 is under a high load. Therefore, the motor 10 can be driven with energy greater than in the normal mode.

However, no electric-current restriction based on the output-limit value is required, even in the normal mode. That is, in the protecting process, the protection threshold values used to determine errors in the battery voltage, the load current, the controller temperature, and the motor temperature may be set to values that differ from those in the normal mode and the power mode.

Figure 28:
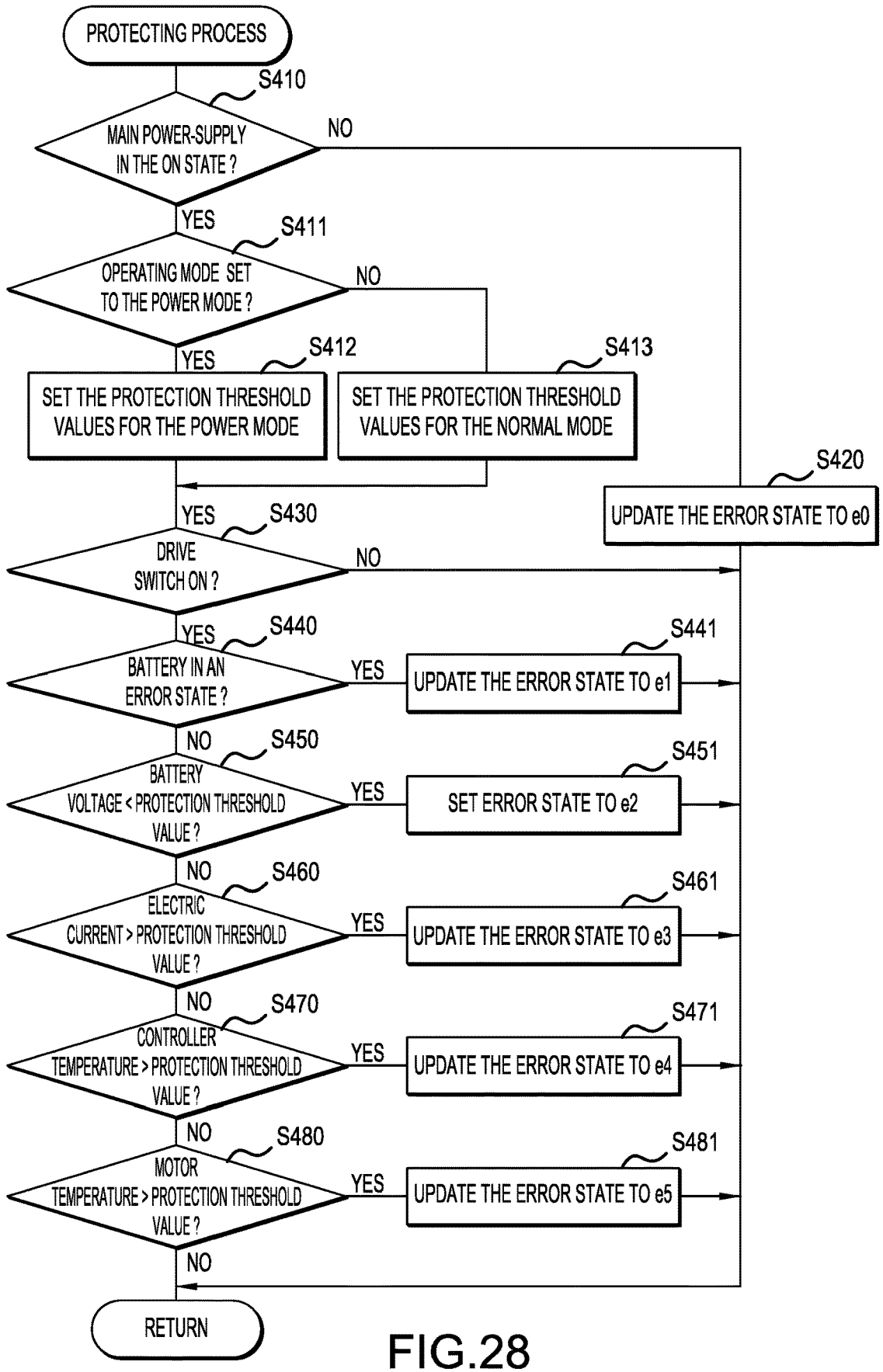
FIG. 28 is a flow chart that shows a modified example of the protecting process.

For example, in the modified protecting process shown in FIG. 28, it is determined in S410 whether the main power supply is in the ON state; in S411, it is determined whether the operating mode is set to the power mode by determining whether the power-mode flag is set.

If the operating mode is not set to the power mode (S411: No), then the protection threshold values for the normal mode, the same as in the above-mentioned embodiment, are set in S413 as the protection threshold values for each of the above parameters, after which the process proceeds to S430.

On the other hand, if the operating mode is set to the power mode (S411: Yes), then protection threshold values for the power mode, which are set such that errors tend not to be determined compared with the normal mode, are set in S412 as the protection threshold values for each of the above parameters, after which the process proceeds to S430.

In this way, the error-determination criteria are more relaxed in the power mode than in the normal mode, and therefore, even though the motor 10 is driven with energy greater than that in the normal mode, it becomes possible to reduce the likelihood that driving of the motor 10 will be stopped by the protection function.

In addition, although the electric-current restriction based on an output-limit value is eliminated in the power mode in the above embodiments, the electric-current restriction based on an output-limit value may be implemented, and the threshold value of the load current to which the electric current is restricted may be changed in accordance with the power mode and the normal mode.

Figure 29:
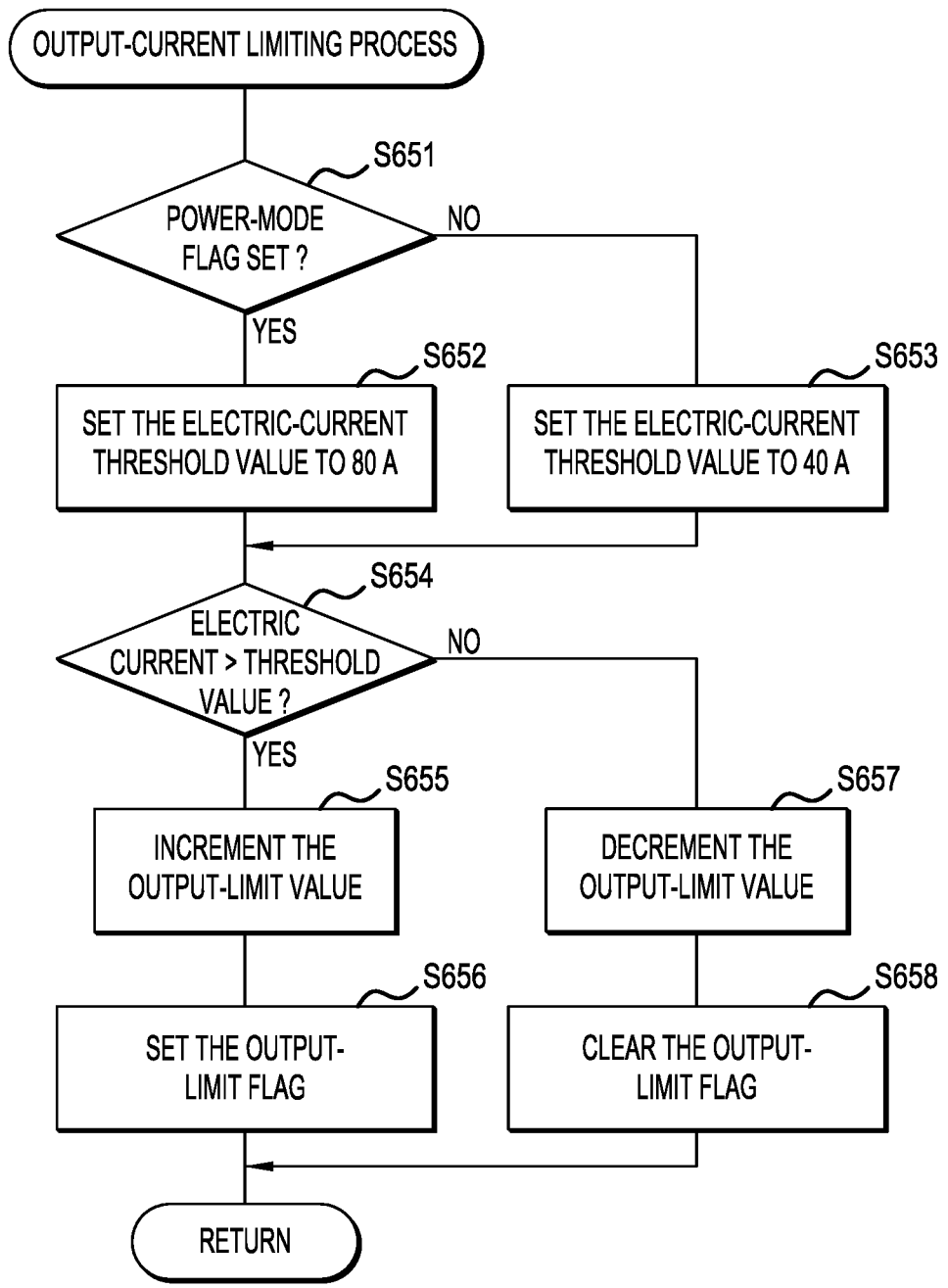
FIG. 29 is a flow chart that shows a modified example of the output-current limiting process.

For example, this modification of the output-current limiting process shown in FIG. 17 may be implemented using the procedure shown in FIG. 29. That is, in the output-current limiting process shown in FIG. 29, it is determined in S651 whether the power-mode flag is set. If the power-mode flag is not set (S651: No), then the threshold value of the load current is set in S653 to an electric-current value (e.g., 40 A) of the normal mode, the same as in the above embodiments, after which the process proceeds to S654.

On the other hand, if the power-mode flag is set (S651: Yes), then the threshold value of the load current is set in S652 to an electric-current value (e.g., 80 A) that is larger than the electric-current value of the normal mode, after which the process proceeds to S654.

Furthermore, in S654, it is determined whether the load current exceeds the preset threshold value as described above. If the load current exceeds the threshold value, then a prescribed additional value is added to the output-limit value in S655; then continuing to S656, the output-limit flag is set, after which the output-current limiting process ends.

On the other hand, if it is determined in S654 that the load current does not exceed the prescribed threshold value, then a prescribed current value is subtracted from the output-limit value in S657; then continuing to S658, the output-limit flag is cleared, after which the output-current limiting process ends.

By performing the output-current limiting process in this modified manner, the threshold value of the load current (in other words, an electric-current limit value) is made larger in the power mode than that in the normal mode, and therefore it becomes possible to drive the motor 10 with energy greater than that in the normal mode.

Although embodiments and modified examples for carrying out the present disclosure were described above, the present disclosure is not limited thereto and various modifications can be made.

For example, although embodiments were described above in which the present teachings are applied to chain saws 2 that operate by receiving the supply of electric power from battery packs 8, the same as in the above embodiments, the present teachings can be adapted to any type of electric work machine, as long as it comprises a motor and a control unit that drives and controls the motor.

In addition, in particular, if the present teachings are adapted to a handheld electric work machine, because it becomes possible to perform special work, in which the load applied to the motor is larger than that during normal work, without the electric work machine increasing in size, the advantageous effects of the present teachings can be exhibited more effectively.

It is noted that, although the use of the power mode in the present disclosure is limited to protecting the electric work machine, the power-supply apparatus, or the like, this limitation may be tightened more than in the normal mode, as in the above embodiments, or may be the same as in the normal mode. That is, the restriction of the power mode should be set to a level such that the electric work machine, the power-supply apparatus, or the like does not break down or deteriorate and such that transitioning to the power mode is not necessarily more difficult than to the normal mode.

In addition, cases were described in the above embodiments in which the operating mode is set to the power mode or the normal mode based on the operation (pressing) time of the main power-supply SW 21 when the main power-supply SW 21 is operated and the control circuit 36 (control unit) is started.

Thus, because techniques that set the operating mode of the control unit based on the operation time of the start switch when the control unit is started are suited to operating a control unit in a special mode, such as the power mode, it is possible to adapt the present disclosure to technical fields that differ from those of the present disclosure.

In addition, a plurality of functions having one structural element in the above embodiments may be implemented by a plurality of structural elements, one function having one structural element may be implemented by a plurality of structural elements, and so on. In addition, a plurality of functions having a plurality of structural elements may be implemented by one structural element, one function implemented by a plurality of structural elements may be implemented by one structural element, and the like. In addition, some of the structural elements in the above embodiments may be omitted. In addition, at least some of the structural elements in the above embodiments may be added to or replaced by structural elements in other embodiments mentioned above. It is noted that any aspect that is included in the technical concepts specified based on the text of the claims is an embodiment of the present invention.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the controller (control circuit 36), is also understood as a corresponding method step or as a feature of a method step. In an analogous manner, aspects which have been described in the context of or as a method step also represent a description of a corresponding block or detail or feature of a corresponding device, such as the control unit.

Depending on certain implementation requirements, exemplary embodiments of the controller (control circuit 36) of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals that are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control unit, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components.

Therefore, although some aspects of the control unit have been identified as "parts" or "steps", it is understood that such parts or steps need not be physically separate or distinct electrical components, but rather may be different blocks of program code that are executed by the same hardware component, e.g., one or more microprocessors.

EXPLANATION OF THE REFERENCE NUMBERS

2 Chain saw
8 Battery pack
9 Battery
10 Motor
18 Drive SW
20 Operation panel
21 Main power-supply SW
24 Power-mode-setting SW
25 Speed-switching SW
27 Mode-changing SW
22 State-indication part 26 Speed-indication part
28 Oil-detection part
30 Motor-drive unit
32 Drive circuit
34 Gate circuit
36 Control circuit
38 Memory
40 Regulator
42 Battery-voltage-detection part
44 Electric-current detection circuit
46 Data-communication part
48, 52 Temperature sensors
50 Rotation sensor

The invention claimed is:

1. An electric work machine, comprising:
a motor, and
a control unit that controls rotation of the motor;
wherein the control unit is configured such that:
an operating mode is switchable between a normal mode, in which the motor is rotated within a prescribed output range, and a power mode, in which the motor is rotatable with energy greater than that in the normal mode; and
use of the power mode is restricted; and
wherein the control unit is configured to:
receive a first signal from a manually-operable switch indicative that the power mode has been selected by a user,
determine based upon one or more parameters whether the electric work machine is in a state that premature deterioration or permanent damage may be caused to the electric work machine by performing the power mode;
switch the operating mode to the power mode in response to (i) receipt of the first signal and (ii) a determination that the electric work machine is not in a state that premature deterioration or permanent damage may be caused to the electric work machine by performing the power mode; and
prohibit switching the operating mode to the power mode in response to (i) receipt of the first signal and (ii) a determination that the electric work machine is in a state that premature deterioration or permanent damage may be caused to the electric work machine by performing the power mode; and
wherein the control unit is configured to transition from the power mode to the normal mode or to a stopped state if, in the power mode, an amount of electric power consumed to drive the motor reaches a predetermined value.

2. The electric work machine according to claim 1, wherein:
the normal mode is an operating mode in which continuous use is possible; and
the power mode is an operating mode in which the motor is permitted to be rotated only for a prescribed period of time.

3. The electric work machine according to claim 2, wherein:
the electric work machine is configured to operate by receiving a supply of electric power from a battery.

4. The electric work machine according to claim 3, wherein:
the control unit is configured to prohibit switching the operating mode to the power mode based at least in part on a state or a usage state of the battery.

5. An electric work machine comprising:
a motor, and
a control unit that controls rotation of the motor;
wherein the control unit is configured such that:
an operating mode is switchable between a normal mode, in which the motor is rotated within a prescribed output range, and a power mode, in which the motor is rotatable with energy greater than that in the normal mode; and
use of the power mode is restricted; and
wherein:
the normal mode is an operating mode in which continuous use is possible;
the power mode is an operating mode in which the motor is permitted to be rotated only for a prescribed period of time;
the electric work machine is configured to operate by receiving a supply of electric power from a battery; and
the control unit is configured to restrict use of the power mode based at least in part on a usage count of the power mode since the battery was mounted on the electric work machine.

6. An electric work machine comprising:
a motor; and
a control unit that controls rotation of the motor;
wherein the control unit is configured such that:
an operating mode is switchable between a normal mode, in which the motor is rotated within a prescribed output range, and a power mode, in which the motor is rotatable with energy greater than that in the normal mode; and
use of the power mode is restricted; and
wherein:
the normal mode is an operating mode in which continuous use is possible;
the power mode is an operating mode in which the motor is permitted to be rotated only for a prescribed period of time;
the electric work machine is configured to operate by receiving a supply of electric power from a battery; and
the control unit is configured to restrict use of the power mode based at least in part on a total usage time of the power mode since the battery was mounted on the electric work machine.

7. The electric work machine according to claim 1, wherein:
the control unit is configured to prohibit switching the operating mode to the power mode based at least in part on a total usage time of the electric work machine.

8. The electric work machine according to claim 1, wherein:
the manually-operable switch is a power supply switch that starts and stops the control unit; and
the control unit is configured to transition to the normal mode in accordance with an operation state of the power supply switch during startup.

9. The electric work machine according to claim 1, wherein the control unit is configured such that:
in the normal mode, the control unit sets a first upper limit current value for restricting the amount of electric current that is supplyable to the motor in the normal mode, and
in the power mode, the control unit either (i) sets a second upper limit current value for restricting the amount of electric current that is supplyable to the motor in the power mode, the second upper limit current value being higher than the first upper limit current value, or (ii)

sets no upper limit current value such that the amount of electric current that is supplyable to the motor in the power mode is unrestricted.

10. The electric work machine according to claim 9, wherein the control unit is configured to restrict use of the power mode based at least in part on:
a total usage count or a usage time of the power mode since a battery was mounted on the electric work machine;
a total usage time or a usage count of the electric work machine;
a current voltage of the battery; and
a current temperature of at least one of the battery, the control unit or the motor.

11. The electric work machine according to claim 10, wherein:
the manually-operable switch is a power supply switch that starts and stops the control unit; and
the control unit is configured to transition to the normal mode in accordance with an operation state of the power supply switch during startup.

12. The electric work machine according to claim 11, wherein the control unit is configured such that:
continuous operation of the motor is permitted in the normal mode; and
the motor is permitted to be operated only for a prescribed period of time in the power mode.

13. The electric work machine according to claim 12, wherein the electric work machine is a chain saw comprising a saw chain that is driven by the motor to circulate about a guide bar.

14. An electric power tool, comprising:
an electric motor,
at least one processor, and
a non-transitory computer readable medium comprising computer readable instructions that, when executed by the at least one processor, cause the at least one processor to:
cause the electric motor to be rotated within a prescribed output range when a normal operating mode is selected,
cause the electric motor to be rotated above the prescribed output range in response to: (i) receipt of a first signal from a manually-operable switch indicative that a power operating mode has been selected by a user and (ii) a predetermined set of parameters being satisfied,
prohibit switching to the power operating mode in response to one or more of the predetermined set of parameters not being satisfied, and
cause the electric motor to transition from the power operating mode to the normal operating mode or to a stopped state if, in the power operating mode, an amount of electric power consumed to drive the motor reaches a predetermined value.

15. The electric power tool according to claim 14, wherein the non-transitory computer readable medium comprises further computer readable instructions that, when executed by the at least one processor, cause the at least one processor to:
permit continuous operation of the electric motor in the normal operating mode; and
permit the electric motor to be operated only for a prescribed period of time in the power operating mode.

16. The electric power tool according to claim 15, wherein the predetermined set of parameters includes:
a total usage count or a usage time of the power operating mode since a battery was mounted on the electric power tool;
a total usage time or a usage count of the power tool;
a current voltage of the battery; and
a current temperature of at least one of the battery, the processor or the electric motor.

17. The electric power tool according to claim 16, wherein the non-transitory computer readable medium comprises further computer readable instructions that, when executed by the at least one processor, cause the at least one processor to:
in the normal operating mode, set a first upper limit current value for restricting the amount of electric current that is supplyable to the electric motor in the normal operating mode, and
in the power operating mode, either (i) set a second upper limit current value for restricting the amount of electric current that is supplyable to the electric motor in the power operating mode, the second upper limit current value being higher than the first upper limit current value, or (ii) set no upper limit current value such that the amount of electric current that is supplyable to the electric motor in the power operating mode is unrestricted.

* * * * *